United States Patent
Sato

(10) Patent No.: US 7,286,321 B2
(45) Date of Patent: Oct. 23, 2007

(54) THIN FILM MAGNETIC HEAD HAVING TOROIDAL COIL AND MANUFACTURING METHOD OF THE SAME

(75) Inventor: Kiyoshi Sato, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 391 days.

(21) Appl. No.: 10/797,794

(22) Filed: Mar. 10, 2004

(65) Prior Publication Data

US 2004/0179298 A1    Sep. 16, 2004

(30) Foreign Application Priority Data

Mar. 14, 2003 (JP) .............. 2003-069330
Aug. 14, 2003 (JP) .............. 2003-293390

(51) Int. Cl.
G11B 5/17 (2006.01)
G11B 5/31 (2006.01)

(52) U.S. Cl. ..................... 360/123; 360/126
(58) Field of Classification Search ............... 360/125, 360/126, 123
See application file for complete search history.

(56) References Cited

U.S. PATENT DOCUMENTS

| | | | | |
|---|---|---|---|---|
| 5,969,911 A * | 10/1999 | Hikami et al. | ............... | 360/317 |
| 5,995,342 A * | 11/1999 | Cohen et al. | ............... | 360/126 |
| 6,195,232 B1 * | 2/2001 | Cohen | ............... | 360/126 |
| 6,236,538 B1 * | 5/2001 | Yamada et al. | ............... | 360/126 |
| 6,275,354 B1 * | 8/2001 | Huai et al. | ............... | 360/126 |
| 6,459,543 B1 * | 10/2002 | Sasaki | ............... | 360/126 |
| 6,694,603 B1 * | 2/2004 | Zhang et al. | ............... | 29/603.03 |
| 6,729,012 B1 * | 5/2004 | Sasaki | ............... | 29/603.07 |
| 2002/0089783 A1 * | 7/2002 | Matono | ............... | 360/126 |

FOREIGN PATENT DOCUMENTS

| | | |
|---|---|---|
| EP | 0 402 880 | 6/1990 |
| GB | 2 271 880 | 4/1994 |
| GB | 2 395 597 | 5/2004 |
| GB | 2 396 247 | 6/2004 |
| GB | 2 399 213 | 9/2004 |
| JP | 50-147916 | 11/1975 |
| JP | 50-147917 | 11/1975 |

(Continued)

OTHER PUBLICATIONS

Notification of Reasons for Refusal dated May 2, 2006, for corresponding Japanese Patent Application No. 2003-293390.

Primary Examiner—William J Klimowicz
(74) Attorney, Agent, or Firm—Brinks Hofer Gilson & Lione

(57) ABSTRACT

Within a space surrounded by a lower core layer, an upheaval layer, and a back gap layer, there are a plurality of first coil pieces arranged in a height direction and covered with a coil insulating layer. On the coil insulating layer, the upheaval layer, and a layered product formed on the back gap layer, a plurality of second coil pieces are arranged in the height direction with an insulating layer therebetween. Between the lower core layer and the first coil pieces, raised layers are formed, and the first coil pieces are in contact with the second coil pieces on connection surfaces exposed from the coil insulating layer on the raised layers.

22 Claims, 23 Drawing Sheets

FOREIGN PATENT DOCUMENTS

| | | |
|---|---|---|
| JP | 61-132516 | 8/1986 |
| JP | 01-282715 | 11/1989 |
| JP | 04-356707 | 12/1992 |
| JP | 05089429 A * | 4/1993 |
| JP | 5-174332 | 7/1993 |
| JP | 05-250636 | 9/1993 |
| JP | 06-103526 | 4/1994 |
| JP | 07153026 A * | 6/1995 |
| JP | 07225918 A | 8/1995 |
| JP | 11-316910 | 11/1999 |
| JP | 2003006814 A * | 1/2003 |

* cited by examiner

THIN FILM MAGNETIC HEAD HAVING TOROIDAL COIL AND MANUFACTURING METHOD OF THE SAME

This application claims the benefit of priority to Japanese Patent Application Nos. 2003-069330 and 2003-293390, herein incorporated by reference.

BACKGROUND OF THE INVENTION

1. Field of the Invention

The present invention relates to a thin film magnetic head having a toroidal coil structure winding about a magnetic layer, and in particular relates to a thin film magnetic head capable of further simply connecting between first coil pieces and second coil pieces with small connection resistance and capable of improving the magnetization efficiency while suppressing the magnetic saturation.

2. Description of the Related Art

Japanese Unexamined Patent Application Publication No. 5-250636, which will be described below, discloses a toroidal thin film magnetic head in that coil pieces are toroidally wound about a magnetic layer constituting an inductive head (recording head). The sectional shape of this thin film magnetic head is copied on FIG. 33.

As shown in FIG. 33, on a substrate 2, first coil pieces 5 are formed under the magnetic layer 4 with an insulating layer 3 therebetween, and on the first coil pieces 5, an insulating layer 6 and the magnetic layer 4 are formed. An insulating layer 7 is formed along from on both sides of the magnetic layer 4 to the upper surface thereof. Along from the upper surface of the insulating layer 7 to the upper surfaces of the first coil pieces 5, second coil pieces 8 are formed with a through-hole 12 therebetween. The first coil pieces 5 and the second coil pieces 8 are electrically connected together in a connected state with connection portions 9. On the side of the connection portion 9, an insulating layer 10 is formed while an insulating layer 11 is formed along from the upper surface of the second coil pieces 8 to the upper surface of the insulating layer 7.

On the other hand, Japanese Unexamined Patent Application Publication No. 50-147916, No. 50-147917, and Japanese Unexamined Utility Model Registration Application Publication No. 61-132516 also disclose a toroidal thin film magnetic head having coil pieces toroidally wound about a magnetic layer constituting an inductive head (recording head). Also, in these thin film magnetic heads, first coil pieces formed under a magnetic layer and second coil pieces formed on the magnetic layer are electrically connected together in a contact state. In these thin film magnetic heads, a recess is formed on the surface of a lower core layer, and along from the surface of the lower core layer to the bottom surface of the recess, the first coil pieces are formed on the magnetic layer. The center region of the first coil pieces is formed along from the upper surface of the recess to the side thereof, and the side-ends of the first coil pieces are formed on the surface of the lower core layer. Therefore, the both side-ends of the first coil pieces are positioned above the center region. The both side-ends of the first coil pieces are electrically connected to the side-ends of the second coil pieces in a contact state.

However, in the thin film magnetic head 1 disclosed in Japanese Unexamined Patent Application Publication No. 5-250636, it is necessary for connecting the first coil pieces 5 to the second coil pieces 8 to form the through-hole 12 on the insulating layer 7. It is disclosed that the through-hole 12 is formed by etching; however, since it is difficult to form the through-holes 12 at precise positions and depths with a high degree of accuracy, there has been a problem that the connection between the first coil pieces 5 and the second coil pieces 8 becomes defective and the coil resistance is increased. That is, the positional displacement of the through-holes 12 and reduction in size of the through-hole 12 reduce contact areas between the first coil pieces 5 and the second coil pieces 8, and increase the electrical resistance. As a result, heat is liable to be produced in the vicinity of the connection portion 9, increasing the inside temperature of the thin film magnetic head. If the inside temperature of the thin film magnetic head is increased, a surface opposing a recording medium protrudes in front of the substrate (slider) because of the thermal expansion coefficient difference to the core layer and the insulating layer. As a result, the thin film magnetic head may collide on the recording medium so as to damage the thin film magnetic head and the recording medium.

There is also a problem that the first coil pieces are damaged during forming the through-holes.

In the thin film magnetic head 1 disclosed in Japanese Unexamined Patent Application Publication No. 5-250636, the second coil pieces 8 are connected to the first coil pieces 5 in a downward slanted state, and the film thickness of the slanted portion is reduced because the plating is difficult to be promoted therein. Thereby, this also produces problems of increase in electric resistance and of the thermal development.

In the thin film magnetic heads disclosed in Japanese Unexamined Patent Application Publication No. 50-147916, No. 50-147917, and Japanese Unexamined Utility Model Registration Application Publication No. 61-132516, since the lower core layer is provided with a recess formed thereon, the sectional area of the lower core layer is reduced, the magnetic saturation is facilitated.

Furthermore, in the thin film magnetic heads disclosed in Japanese Unexamined Patent Application Publication No. 50-147916, No. 50-145917, and Japanese Unexamined Utility Model Registration Application Publication No. 61-132516, in the same way as that in Japanese Unexamined Patent Application Publication No. 5-250636, the connection portion between the first coil pieces and the second coil pieces is provided with the through-hole. The first coil pieces and the second coil pieces are connected together via the through-holes, so that the electric resistance and thermal development are liable to increase in the vicinity of the connection portion between the first coil pieces and the second coil pieces because of faulty connection. Also, in the method for connecting the first coil pieces to the second coil pieces by forming through-holes, the first coil pieces may be damaged during the forming the through-holes.

SUMMARY OF THE INVENTION

Embodiments of the present invention provide a thin film magnetic head capable of further simply connecting between first coil pieces and second coil pieces with small connection resistance as well as being capable of improving the magnetization efficiency while suppressing the magnetic saturation.

According to the present invention, there is provided a thin-film magnetic head that comprises a lower core layer formed so as to extend in a height direction from a surface opposing a recording medium; a magnetic layer connected to the lower core layer directly or indirectly at a position spaced from the opposing surface in the height direction by a predetermined distance; and a coil layer toroidally winding around the magnetic layer, wherein the toroidal coil layer is connected to a plurality of first coil pieces formed between the lower core layer and the magnetic layer and a plurality of second coil pieces formed on the magnetic layer, and wherein the upper surfaces of the first coil pieces are covered with an insulating layer other than connection surfaces to the second coil pieces, the connection surfaces of the first coil pieces being raised upward and exposed from the upper surface of the insulating layer so that the second coil pieces are formed in contact with the connection surfaces of the first coil pieces.

In the thin film magnetic head according to the present invention, from the upper surface of the insulating layer covering the upper surfaces of the first coil pieces, the connection surfaces of the first coil pieces are exposed so as to form the second coil pieces on the connection surfaces in a direct contact state. In such a manner, according to the present invention, the connection between the first coil pieces and the second coil pieces is simply enabled without through-holes as ever, and also the connection between the first coil pieces and the second coil pieces can be assured. Therefore, the electrical resistance of connection portions between the first coil pieces and the second coil pieces can be reduced smaller than ever, suppressing the thermal development. Accordingly, increase in the inside temperature of the thin film magnetic head can be suppressed so that the thermal expansion of the thin film magnetic head is reduce, preventing the thin film magnetic head and a recording medium from being damaged.

Preferably, a thin film magnetic head according to the present invention further comprises a raised layer provided on the lower core layer at a position spaced in a track width direction from the center of the lower core layer in the track width direction, wherein part of the first coil pieces is mounted on the raised layer, part of the upper surfaces of the first coil pieces being exposed from the upper surface of the insulating layer at the position on that the first coil pieces mount, so that the exposed surface becomes the connecting surface.

Since the raised layer is formed independently from the lower core layer, without a recess provided in the lower core layer as ever, and by mounting part of the first coil pieces on the raised layer, part of the upper surfaces of the first coil pieces can be simply exposed at positions mounting thereon from the upper surface of the insulating layer. In this configuration, the area of the connection surfaces of the first coil pieces can be easily controlled, and the insulation to the second coil pieces can be ensured by the uniform insulating layer surrounding the connection surface with a sufficient film thickness. Also, the lower core layer is difficult to be magnetically saturated, achieving favorable magnetization characteristics.

Preferably, the upper surface of the raised layer is a flattening surface, and at least part of the first coil pieces mounted on the flattening surface becomes the connecting surface. By such a structure, the connection between the first coil pieces and the second coil pieces can be further improved.

When the first coil pieces are formed partway the flattening surface, the first coil pieces can be especially formed with a sufficient film thickness.

According to the present invention, the upper surface of the raised layer may be a curved surface, and part of the first coil pieces mounted on the curved surface may become the connecting surface. Even in such a case, it is preferable that the first coil pieces be formed partway the curved surface.

According to the present invention, it is preferable that the upper surface of the insulating layer and the connection surfaces of the first coil pieces be an identical flattening surface. By such a structure, the magnetic layer may be easily formed on the flattened surface and the track width Tw may be readily controlled with a high degree of accuracy. Also, the connection between the first coil pieces and the second coil pieces can be further ensured.

The raised layer may intersect under a plurality of the first coil pieces. The raised layer may also be arranged under each of the first coil pieces.

On the lower core layer, a lower magnetic polar layer, a gap layer, and an upper magnetic polar layer, which is the magnetic layer, may be deposited in that order from beneath so as to form a deposited structure, and a track width Tw may be determined by the width of the deposited structure on the opposing surface in a track width direction.

In the above-mentioned magnetic layer, the deposited structure having the lower magnetic polar layer, the gap layer, and the upper magnetic polar layer, which is the magnetic layer, is structured so as to connect the lower core layer thereto in both directions of the surface opposing the recording medium and the height, enabling the magnetic layer to be formed on the first coil pieces in a planar shape.

According to the present invention, on the lower core layer, at least a lower magnetic polar layer, a gap layer formed of a non-magnetic metallic material, and an upper magnetic polar layer may be plated in that order from beneath so as to form a magnetic-polar tip layer with a track width Tw defined by a width of an end face adjacent to an opposing surface to a recording medium in a track width direction, and on the magnetic-polar tip layer, the magnetic layer may be deposited.

According to the present invention, the magnetic-polar tip layer is formed on the end of the lower core layer on both sides of the opposing surface to the recording medium, and the magnetic layer becomes the upper core layer for connecting between the height side of the lower core layer and the magnetic-polar tip layer. The first coil pieces and the second coil pieces are wound about the magnetic layer which is the upper core layer.

According to the present invention in that the magnetic layer is the upper core layer, in order to prevent for the magnetic recording outside the recording track width, it is preferable that the saturated magnetic induction density of the magnetic layer be lower than that of the upper magnetic polar layer.

In order to reduce the thermal development of the coil layer, it is preferable that the length of the second coil pieces in a first direction perpendicular to the flowing direction of an electric current be larger than that of the first coil pieces in the first direction. Also, it is preferable that the film thickness of the second coil pieces be larger than that of the first coil pieces.

A manufacturing method of a thin film magnetic head according to the present invention comprises the steps of:

(a) forming a lower core layer so as to extend in a height direction from a surface opposing a recording medium;

(b) forming a raised layer on the lower core layer at a position spaced in a track width direction from the center of the lower core layer in the track width direction, (c) forming a plurality of first coil pieces ranging from on the lower core layer to on the raised layer with separations in the height direction;

(d) forming a coil insulating layer between the first coil pieces and on the first coil pieces;

(f) scraping the upper surface of the coil insulating layer so as to form a flattening surface while exposing part of the first coil pieces formed on the upper surface of the raised layer from the upper surface of the coil insulating layer; and (g) forming a magnetic layer on the coil insulating layer, and then forming a plurality of the second coil pieces on the magnetic layer while forming a toroidal layer composed of the first coil pieces and the second coil pieces by directly bringing an end portion of the second coil pieces into contact with the exposure surface formed on the first coil pieces.

According to the manufacturing method of the thin film magnetic head of the present invention, even when on the upper surfaces of the first coil pieces, the coil insulating layer is formed, part of the first coil pieces may be simply exposed from the upper surface of the coil insulating layer by polishing the coil insulating layer. This exposed surface becomes the connection surface to the second coil pieces, so that it is not necessary to have a process of forming a through-hole on the coil insulating layer for connecting between the first coil pieces and the second coil pieces. Therefore, the exposed surface can be easily produced at a precise position with a high degree of accuracy as the connection surface to the second coil pieces. During the polishing the coil insulating layer, the connection surface can have a predetermined exposed area by adjusting the scraping amount, enabling the connection between the first coil pieces and the second coil pieces to be excellent and the electric resistance to be suppressed. Accordingly, the thermal development inside the magnetic head can be suppressed and the thermal expansion of the thin film magnetic head is reduced while the thin film magnetic head is prevented from being damaged.

Since the raised layer is formed independently from the lower core layer, without a recess provided in the lower core layer as ever, and by mounting part of the first coil pieces on the raised layer, part of the upper surfaces of the first coil pieces can be simply exposed at positions mounting thereon from the upper surface of the insulating layer. Therefore, the area of the connection surfaces of the first coil pieces can be easily controlled, and the insulation to the second coil pieces can be ensured by the uniform insulating layer surrounding the connection surface with a sufficient film thickness. Also, the lower core layer is difficult to be magnetically saturated, achieving favorable magnetization characteristics.

Preferably, in the step (b), the upper surface of the raised layer is formed to be the flattening surface and in the step (f), part of the first coil pieces mounted on the flattening surface is polished to be the exposure surface.

By such a configuration, the second coil pieces may be easily mounted on the exposed surface as the connection surface to the second coil pieces, further improving the connection between the first coil pieces 55 and the second coil pieces 56.

Also, in the step (b), the first coil pieces may be formed partway the flattening surface.

By such a configuration, the first coil pieces can be formed on the flattening surface with a sufficient film thickness.

Preferably, in the step (b), the upper surface of the raised layer is formed to be a curved surface and in the step (f), part of the first coil pieces mounted on the curved surface is polished to be the exposure surface.

In this case, in the step (b), the first coil pieces may be formed partway the curved surface.

Preferably, in the step (f), the upper surface of the coil insulating layer and the exposure surface formed in the first coil pieces are formed to be the same flattening surface.

By such a configuration, the magnetic layer may be easily formed on the coil insulating layer 36 in a predetermined shape, and the track width Tw determined by the width of the magnetic layer on the surface opposing the recording medium may be defined with a high degree of accuracy. Also, the connection between the first coil pieces and the second coil pieces can be ensured.

In this case, in the step (f), the insulating layer and the exposure surface may be formed to be the same flattening surface by CMP.

Preferably, in the step (c), the raised layer intersects under a plurality of the first coil pieces and in the step (b), the raised layer is formed in a band shape. Also, in the step (b), the raised layer may be decoupled into segments so that the raised layer is formed under each of the first coil pieces in the step (c).

In the thin film magnetic head according to the present invention described in detail above, from the coil insulating layer covering the first coil pieces, the connection surfaces between the first coil pieces and the second coil pieces are exposed so as to directly bond the second coil pieces on the connection surfaces. Therefore, the connection between the first coil pieces and the second coil pieces is simply enabled without inclusions such as a connection layer and through-holes as ever, while the electrical resistance can be reduced. Accordingly, the temperature rise in the toroidal coil structure composed of the first coil pieces and the second coil pieces can be reduced to be smaller than ever, suppressing the thermal development in the thin film magnetic head and reducing the protrusion of the thin film magnetic head due to the thermal expansion.

Also, since a recess is not necessary to be provided in the lower core layer, the sectional area of the lower core layer can be increased. Accordingly, the magnetic saturation of the lower core layer is suppressed, improving the magnetization efficiency.

According to the manufacturing method of the thin film magnetic head of the present invention, since by polishing the coil insulating layer, the upper surface of the coil insulating layer is simply exposed to have the connection surface formed on the first coil pieces, the connection surfaces can be easily formed moreover at precise positions with a high degree of accuracy. During the polishing the coil insulating layer, the connection surface can have a predetermined exposed area by adjusting the scraping amount, enabling the connection between the first coil pieces and the second coil pieces to be excellent and the electric resistance to be suppressed. Accordingly, the thermal expansion due to the temperature rise inside the produced thin film magnetic head can be suppressed is reduced, and the thin film magnetic head is prevented from being damaged.

DESCRIPTION OF THE PREFERRED EMBODIMENTS

Figure 1:
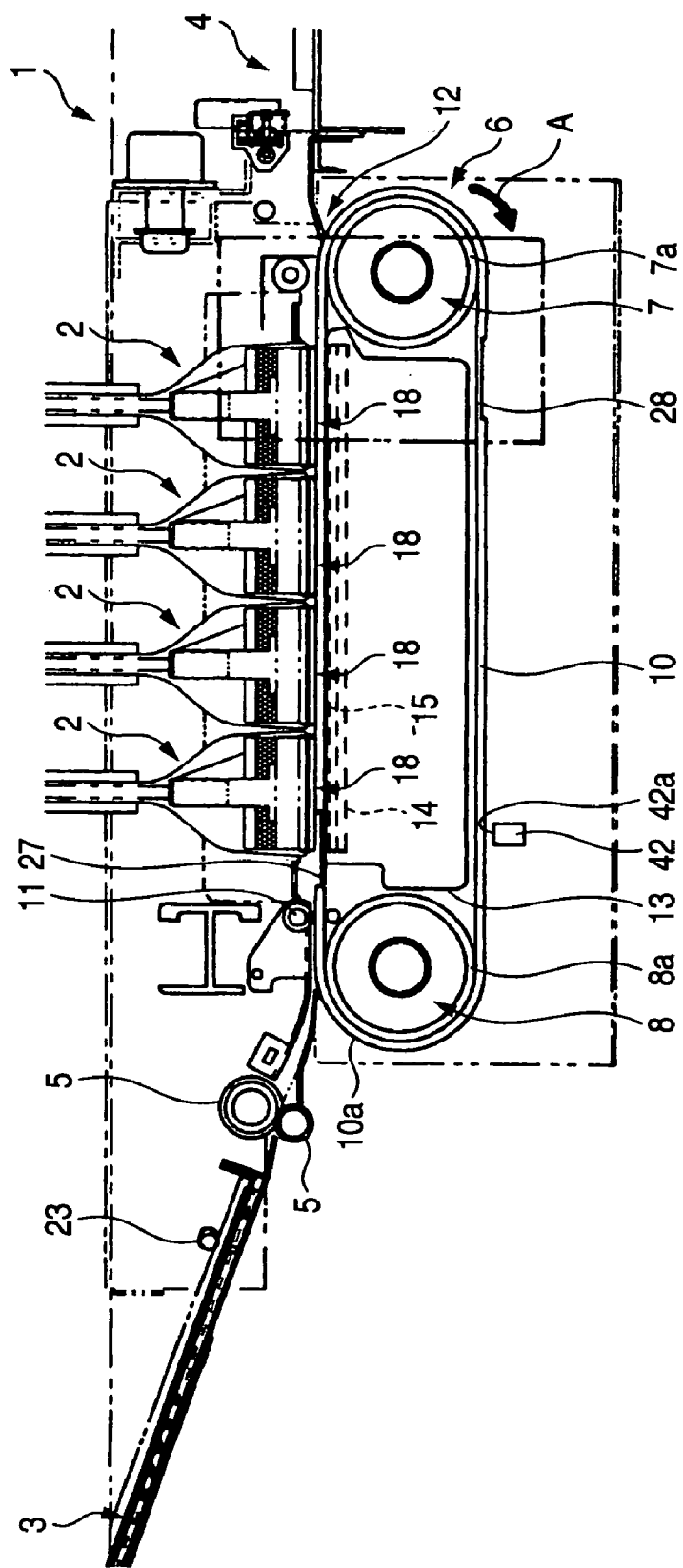
FIG. 1 is a longitudinal sectional view of a thin film magnetic head according to a first embodiment of the present invention.
Figure 2:
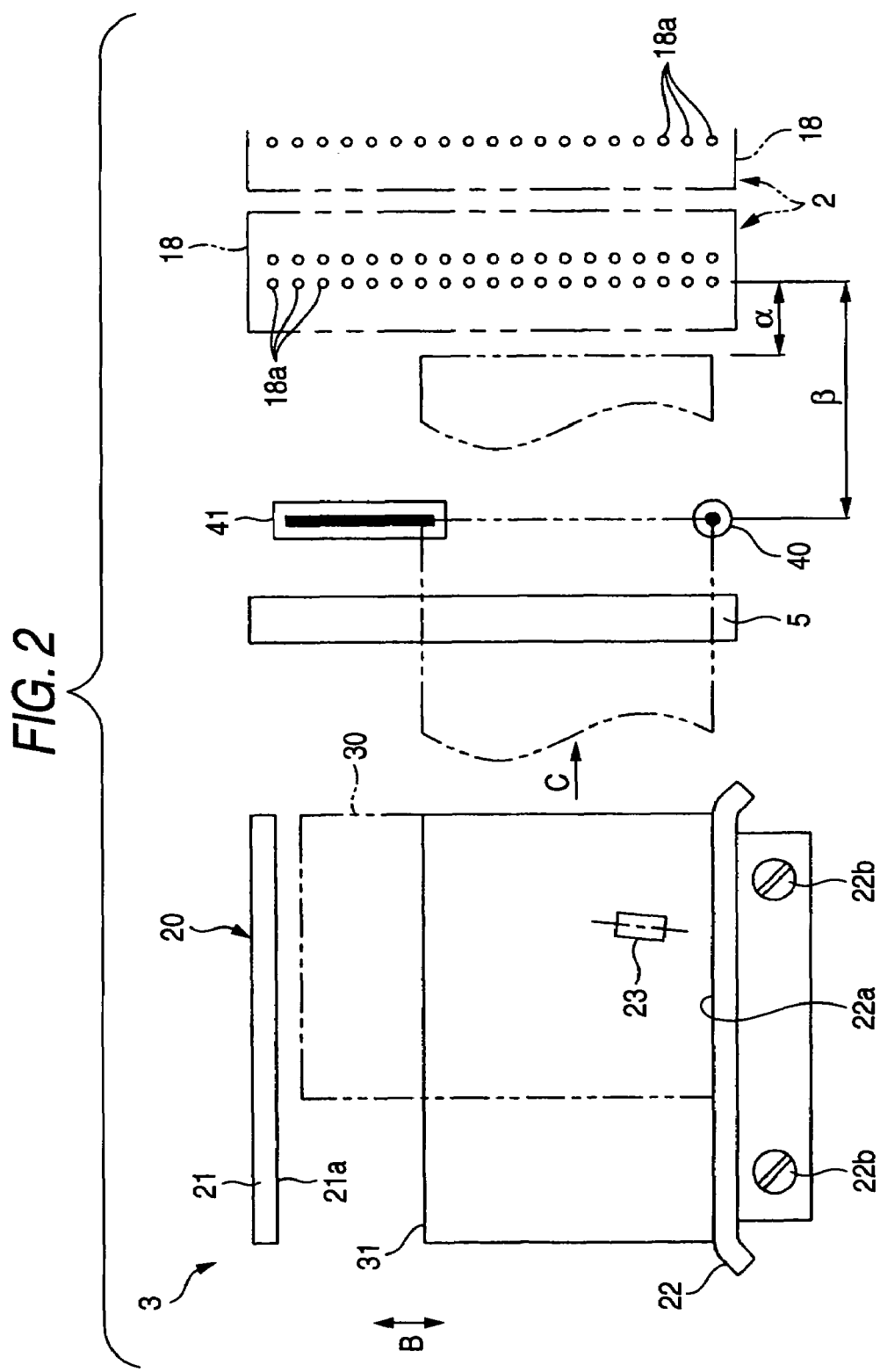
FIG. 2 is a partial front view of the thin film magnetic head shown in FIG. 1.
Figure 3:
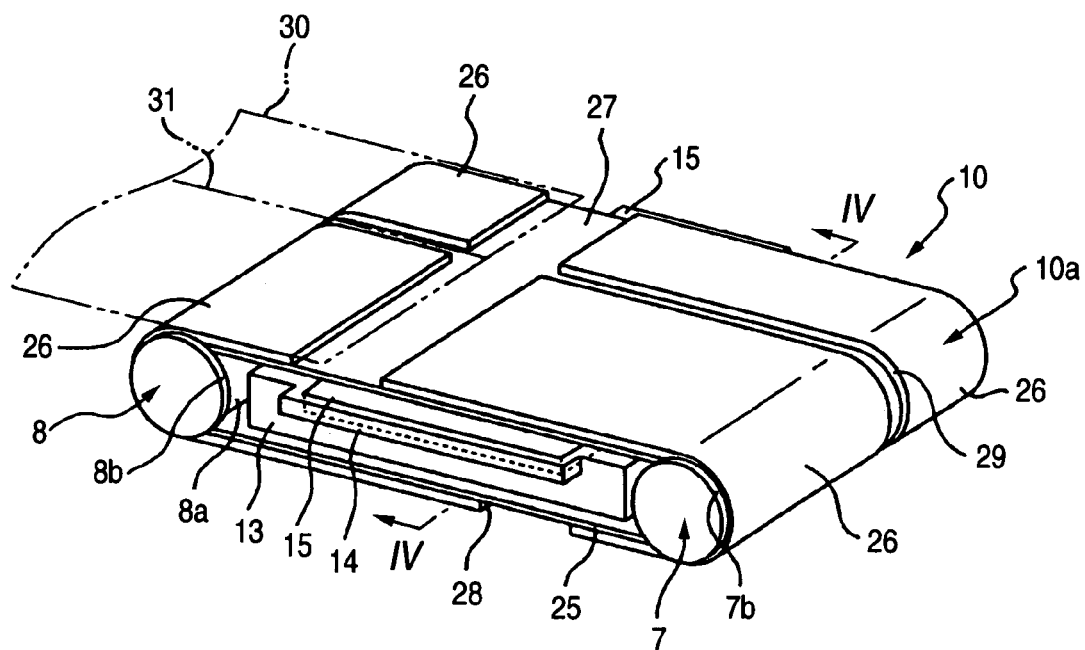
FIG. 3 is a partial plan view showing structures of first coil pieces, second coil pieces, and a magnetic layer of the thin film magnetic head shown in FIG. 1.
Figure 4:
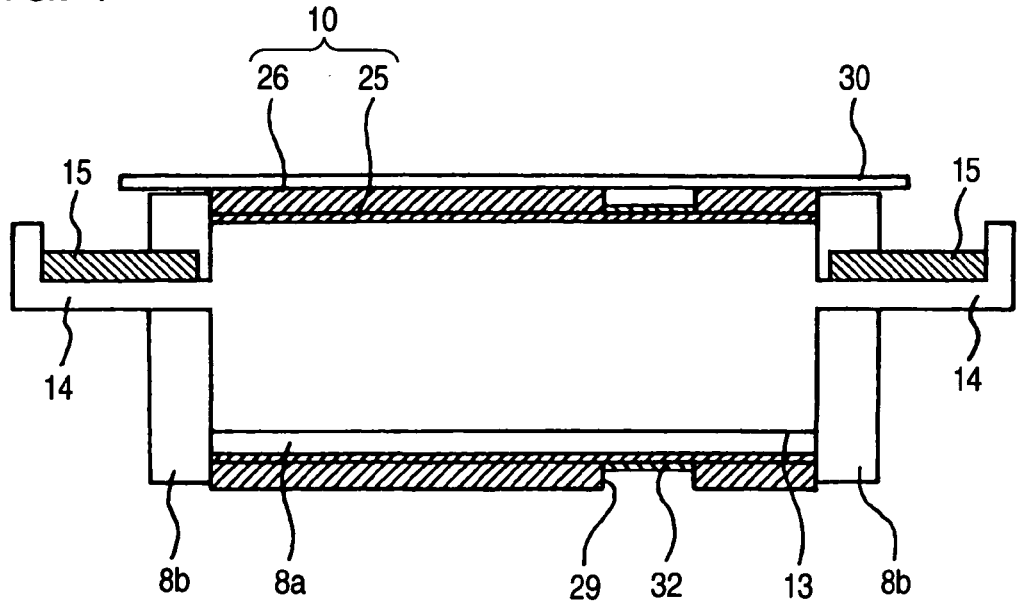
FIG. 4 is a partial plan view showing structures of the first coil pieces and the magnetic layer of the thin film magnetic head shown in FIG. 1.
Figure 5:
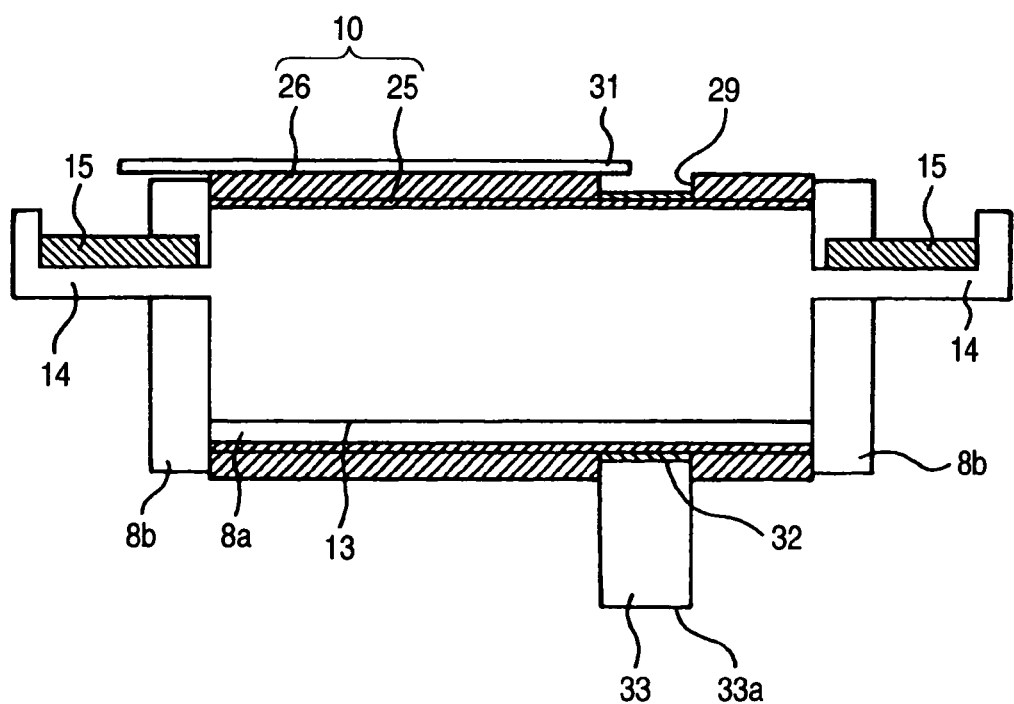
FIG. 5 is a partially enlarged perspective view of the thin film magnetic head shown in FIG. 1.
Figure 6A:
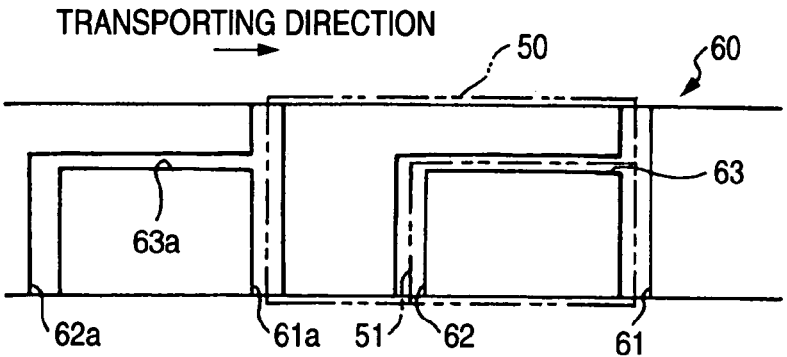
FIG. 6 is a partial plan view showing other structures of the first coil pieces and the magnetic layer of the thin film magnetic head shown in FIG. 1.
Figure 6B:
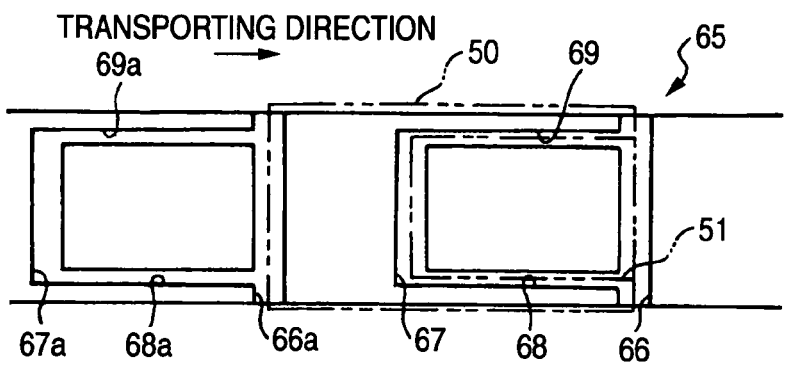
Figure 6C:
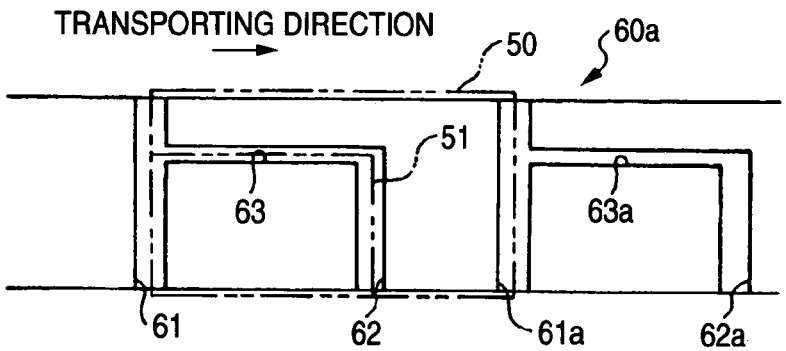
Figure 6D:
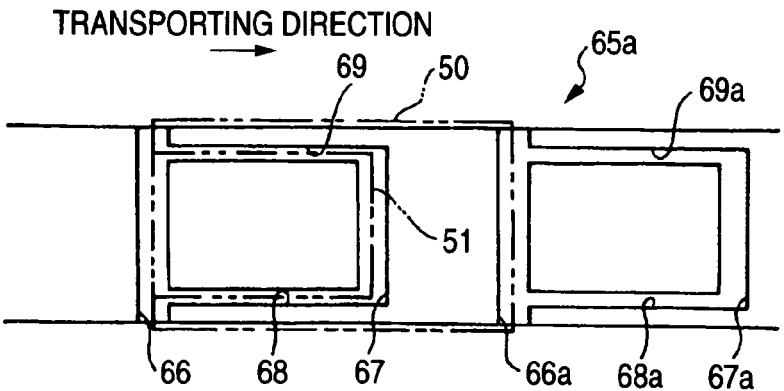

FIG. 1 is a partial sectional view of a thin film magnetic head 1A according to a first embodiment of the present invention; FIG. 2 is a partial front view of the thin film magnetic head 1A shown in FIG. 1 showing first coil pieces, second coil pieces, which are formed mostly adjacent to an opposing surface to a recording medium, and other layers opposing the former layers in the film thickness direction by removing an upheaval layer 32, a protection layer 60, and an MR head from the drawing; FIG. 3 is a partial plan view for illustrating the coil structure of the thin film magnetic head 1A shown in FIG. 1; FIG. 4 is a partial sectional view showing the first coil pieces and a raised layer formed under the first coil pieces of the thin film magnetic head 1A shown in FIG. 1; and FIG. 5 is a partially exploded perspective view of part of the thin film magnetic head 1A shown in FIG. 1.

The X-direction in the drawings will be referred to as a track width direction, and the Y-direction as a height direction below. The Z-direction in the drawings is a traveling direction of a recording medium (magnetic disk). The front end-face of the thin film magnetic head (extreme left surface in FIG. 1) is referred to as the "surface opposing a recording medium". Moreover, in each layer, the "front end-face" denotes the left surface in FIG. 1 while the "rear end-face" denotes the right surface in FIG. 1.

The thin film magnetic head 1A, which will be described with reference to the drawings, is a thin film magnetic head including a composite of a recording head (referred to also as an inductive head) and a reproducing head (referred to also as an MR head); alternatively, it may be composed of only the recording head.

A substrate 20 is made of alumina-titanium carbide ($Al_2O_3$—TiC), and an $Al_2O_3$ layer 21 is formed on the substrate 20.

On the $Al_2O_3$ layer 21, a lower shielding layer 22 made of a Ni—Fe alloy or Sendust is formed, and on the lower shielding layer 22, a lower gap layer 23 made of $Al_2O_3$ is formed.

On the lower gap layer 23, a magneto-resistance effect element 24 represented by a GMR element such as a spin valve thin-film element extending in the height direction (the Y-direction in the drawings) from the surface opposing the recording medium is formed with a predetermined length. On both sides of the magneto-resistance effect element 24 in the track width direction (the X-direction in the drawings), an electrode layer 25 is formed to lengthwise extend in the height direction (the Y-direction in the drawings).

On the magneto-resistance effect element 24 and the electrode layer 25, an upper gap layer 26 is formed with $Al_2O_3$, and on the upper gap layer 26, an upper shield layer 27 made of an Ni—Fe alloy is formed.

The layers from the lower shielding layer 22 to the upper shield layer 27 are referred to as the reproducing head (referred to also as the MR head).

On the upper shield layer 27, as shown in FIG. 1, a separation layer 28 made of $Al_2O_3$ is formed. In addition, on the upper gap layer 26, a next lower core layer 29 may be formed instead of the upper shield layer 27 and the separation layer 28. In this case, the lower core layer 29 also serves as the upper shielding layer.

Referring to FIG. 1, the lower core layer 29 is formed on the separation layer 28. The lower core layer 29 is made of a magnetic material such as a Ni—Fe alloy. The lower core layer 29 is formed to have a predetermined length in the height direction (the Y-direction in the drawings) from the surface opposing the recording medium. At the rear in the height direction of the rear end-face 29a of the lower core layer 29 and also on both sides of the lower core layer 29 in the track width direction (the X-direction in the drawings), a non-magnetic insulating material layer 31 is formed. As shown in FIG. 1, surfaces of the lower core layer 29 and the non-magnetic insulating material layer 31 are a continuous flattening surface.

On the lower core layer 29, the upheaval layer 32 with a predetermined length L1 (see FIG. 5) is formed in the height direction (the Y-direction in the drawings) from the surface opposing the recording medium. Furthermore, at a position separated from the rear end-face 32a of the upheaval layer 32 by a predetermined distance in the height direction (the Y-direction in the drawings), a back gap layer 33 is formed on the lower core layer 29.

The upheaval layer 32 and the back gap layer 33 are made of a magnetic material, and they may be made of the same material as that of the lower core layer 29 or may be made of a different material therefrom. The upheaval layer 32 and the back gap layer 33 may be single-layered or multi-layered. The upheaval layer 32 and the back gap layer 33 are magnetically connected to the lower core layer 29.

As shown in FIG. 1, on the lower core layer 29 between the upheaval layer 32 and the back gap layer 33, a coil insulating substrate-layer 34 is formed. On the coil insulating substrate-layer 34, as shown in FIG. 3, a plurality of first coil pieces 55 is arranged in the height direction so as to extend in the track width direction (the X-direction in the drawings).

A coil insulating layer 36 made of an inorganic insulating material such as $Al_2O_3$ is embedded on the first coil pieces 55. As shown in FIG. 1, the upper surfaces of the upheaval layer 32, the coil insulating layer 36, and the back gap layer 33 are a continuous flattening surface along a reference surface A shown in FIG. 1.

As shown in FIG. 1, on the flattening surface of the upheaval layer 32 and the coil insulating layer 36, a Gd settle layer 38 is formed in the height direction so as to extend from a position separated from the surface opposing the recording medium in the height direction (the Y-direction in the drawings) by a predetermined distance.

According to the embodiment shown in FIG. 1, the front end-face 38a of the Gd settle layer 38 is positioned on the upheaval layer 32 while the rear end-face 38b of the Gd settle layer 38 is positioned on the coil insulating layer 36.

Also, as shown in FIG. 1, on the upheaval layer 32 from the surface opposing the recording medium until the front end-face 38a of the Gd settle layer 38, on the coil insulating layer 36 in the height direction from the rear end-face 38b of the Gd settle layer 38, and on the back gap layer 33, a lower magnetic polar layer 39 and a gap layer 40 are formed from beneath. The lower magnetic polar layer 39 and the gap layer 40 are plated.

As shown in FIG. 1, on the gap layer 40 and the Gd settle layer 38, an upper magnetic polar layer 41 is formed on which an upper core layer 42 is further plated. The upper magnetic polar layer 41 is directly or indirectly connected to the lower core layer 29 via the back gap layer 33.

According to the embodiment, four layers of the lower magnetic polar layer 39, the gap layer 40, the upper magnetic polar layer 41, and the upper core layer 42 constitute a layered product 62. The layered product 62 is not limited to the four-layer structure, shown in FIG. 1, of the lower magnetic polar layer 39, the gap layer 40, the upper magnetic polar layer 41, and the upper core layer 42 deposited from beneath in that order; alternatively, it may be a three-layer structure of the lower magnetic polar layer 39, the gap layer 40, and the upper magnetic polar layer 41 deposited in that order from beneath, for example.

As shown in FIGS. 1 and 2, from the upper surface 62a of the layered product 62 to both end-faces 62b in the track width direction, an insulating layer 58 ranges that is formed of an inorganic insulating material such as $Al_2O_3$ or $SiO_2$ or an organic insulating material such as a resist.

As shown in FIGS. 1 to 3, on the insulating layer 58, a plurality of second coil pieces 56 extending from the track width direction (the X-direction in the drawings) in the height direction (the Y-direction in the drawings) are arranged in the height direction.

As shown in FIG. 2, the upper surfaces 55e of the first coil pieces 55 are covered with the coil insulating layer 36. However, the entire upper surfaces 55e are not covered with the coil insulating layer 36, and a connection surface 81 between the first coil pieces 55 and the second coil pieces 56 is formed to be a flattening surface flush with the upper surface 36a of the coil insulating layer 36.

As shown in FIGS. 2 and 3, on the lower core layer 29, raised layers 80 are formed at positions separated from the center B-B of the track width direction in the thin film magnetic head 1A in the track width direction. The raised layer 80 has a predetermined width, and as shown in FIGS. 3 and 4, is formed in a band shape so as to intersect under the first coil pieces 55. The raised layer 80 is made of an organic insulating material such as a resist.

The first coil pieces 55 are formed to range from on the coil insulating substrate-layer 34 to on the raised layers 80. Therefore, end regions 55a and 55b of the first coil pieces 55 are raised upward in comparison with the center region 55f, so that parts of the end regions 55a and 55b mounting on the raised layers 80 are exposed from the upper surface 36a of the coil insulating layer 36 so as to have an exposed surface as a connection surface 81.

According to the embodiment shown in FIG. 2, the end regions 55a and 55b of the first coil pieces 55 extend to separate from the center B-B further the raised layers 80, so that end-faces 55c and 55d in the track width direction of the first coil pieces 55 are located outside the raised layers 80 in the track width direction.

As shown in FIG. 2, the cross-section of the raised layer 80 in a direction parallel to the X-Z plane has a semi-circular or semi-ellipsoidal shape with a predetermined height h1. Accordingly, the upper surface of the raised layer 80 is a curved surface.

The height h1 denotes a size from the upper surface of the coil insulating substrate-layer 34 to the highest position of the raised layer 80.

Since the raised layer 80 has a predetermined height h1 as mentioned above, as shown in FIGS. 2 to 4, the end regions 55a and 55b of the first coil pieces 55 formed on the raised layers 80 protrude upward higher than the other regions, so that parts of the upper surface of the first coil pieces 55 can be formed to be the connection surfaces 81 at positions mounting on the raised layers 80.

The connection surface 81 is preferable to be a flattening surface flush with the upper surface 36a of the coil insulating layer 36 covering the upper surfaces 55e of the first coil pieces 55 other than the connection surfaces 81. Such a flattening surface is formed by a polishing method such as a CMP technique. As shown in FIG. 2, end regions 56a and 56b of the second coil pieces 56 are directly brought into contact on the connection surfaces 81 in an electrically connected state. That is, one end region 55a of the first coil pieces 55 is electrically connected to one end region 56a of the second coil pieces 56 in a direct contact state therewith on the connection surface 81. Likewise, the other end region 55b of the first coil pieces 55 is electrically connected to the other end region 56b of the second coil pieces 56 in a direct contact state therewith on the connection surface 81.

As shown in FIG. 3, a leading layer 59 is formed in the rear of the second coil piece 56 formed at the mostly rear in the height direction, and is electrically connected to the first coil piece 55 formed at the mostly rear on the connection surfaces 81 in a direct contact state therewith.

In such a manner, in the thin film magnetic head 1A shown in FIG. 1, the end regions 55a and 55b in the track width direction of the first coil pieces 55 and the end regions 56a and 56b in the track width direction of the second coil pieces 56, which vertically oppose each other in the film thickness direction of the layered product 62, are electrically connected together, respectively, in a direct contact state therewith on the connection surfaces 81 so as to have a toroidal coil structure 57.

In the thin film magnetic head 1A, since the first coil pieces 55 and the second coil pieces 56 are electrically connected together, respectively, in a direct contact state without intervening inclusions such as a connection layer, the electrical resistance due to the inclusions is not produced. Since the raised layers 80 are formed under the end regions 55a and 55b of the first coil pieces 55 so as to raise the end regions 55a and 55b upward higher than the center region 55f, even when the coil insulating layer 36 is formed on the upper surfaces 55e of the first coil pieces 55, as long as the coil insulating layer 36 is polished by the CMP, the connection surfaces 81 to the second coil pieces 56 can be simply exposed, eliminating to form through-holes on the coil insulating layer 36. If the through-holes are assumed to form on the coil insulating layer 36, etching might be needed. Since it is difficult to form the through-holes by the etching at precise positions and depths with a high degree of accuracy, the positional displacement of the through-holes reduces contact areas between the first coil pieces 55 and the second coil pieces 56, and increases the electrical resistance, thereby producing heat in connection portions between the first coil pieces 55 and the second coil pieces 56. Also, a problem arises in that forming the through-holes damages the end regions 55a and 55b of the first coil pieces 55.

Whereas, in the thin film magnetic head 1A, the connection surface 81 is determined by the position at which the raised layer 80 is formed, enabling the connection surface 81 to be formed at a precise position with a high-degree of accuracy because the raised layer 80 is formed by photo-etching. Also, during polishing the coil insulating layer 36 by the CMP technique, the connection surface 81 can be exposed so as to have a predetermined exposed area by adjusting the scraping amount. Therefore, the excellent connections between the first coil pieces 55 and the second coil pieces 56 are enabled, suppressing the increase in electrical resistance.

Furthermore, since a recess is not necessary to be provided in the lower core layer 29, the sectional area of the lower core layer 29 can be increased. Accordingly, the magnetic saturation of the lower core layer 29 is suppressed, improving the magnetization efficiency.

According to the embodiment, by providing the band-shaped raised layer 80 only on the required portions of the lower core layer 29, not only the insulation performances between the first coil pieces 55 and the second coil pieces 56 other than the connection surfaces 81, between the second coil pieces 56, and between the layered product 62 but also the insulation performances between the lower core layer 29 and the second coil pieces 56 and between the lower core layer 29 and the layered product 62 on regions outside the end-faces 55c and 55d of the first coil pieces 55 and between the first coil pieces 55 can be easily assured with a sufficient film thickness by the coil insulating layer 36 covering the upper surfaces 55e of the first coil pieces 55.

Since the connection surface 81 is formed as a flattening surface flush with the upper surface 36a of the coil insulating layer 36, the end regions 56a and 56b of the second coil pieces 56 can be easily mounted on the connection surfaces 81 so that the first coil pieces 55 are preferably connected to the second coil pieces 56. Therefore, the contact resistance between the first coil pieces 55 and the second coil pieces 56 can be further suppressed. Since the upper surface 36a of the coil insulating layer 36 is a flattening surface, the layered product 62 can be easily formed on the coil insulating layer 36 in a predetermined shape, so that the track width Tw determined by the width of the layered product 62 on the surface opposing the recording medium can be ensured with a high degree of accuracy.

In order to improve the connection to the second coil pieces 56 by increasing the area of the connection surfaces 81, it is at least preferable that widths of the end regions 55a and 55b of the first coil pieces 55 at positions mounting on the raised layers 80 be larger than the width of the center region 55f. Also, it is preferable that widths of the end regions 55a and 55b at positions mounting on the raised layers 80 be larger than the widths of the second coil pieces 56. Also, the area of the connection surfaces 81 may be smaller than the area of the bottom surfaces 56a1 and 56b1 of the end regions 56a and 56b in the second coil pieces 56 at positions mounting on the connection surfaces 81 and the coil insulating layer 36. However, since if it is too small, the electrical resistance increases, it is preferable that the area of the connection surfaces 81 be within a range of 50% to 100% of the area of the bottom surfaces 56a1 and 56b1 of the end regions 56a and 56b in the second coil pieces 56 at positions mounting on the connection surfaces 81 and the coil insulating layer 36.

According to the embodiment shown in FIG. 4, the raised layer 80 is formed in a band shape with a predetermined width extending substantially in the height direction so as to intersect under a plurality of the first coil pieces 55; however, the present invention is not limited to this, and as shown in FIG. 6, the raised layer 80 may be composed of a plurality of raised pieces 80a that are arranged under the respective first coil pieces 55 so that the raised pieces 80a upward raise the end regions 55a and 55b of the first coil pieces 55, respectively.

Figure 7A:
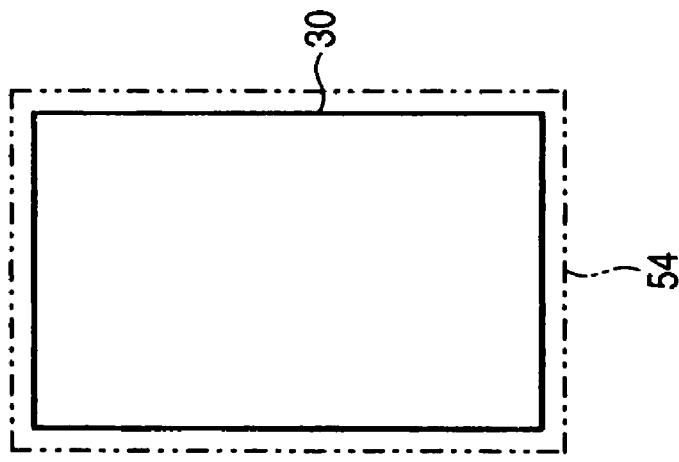
FIG. 7 is a partial front view of a thin film magnetic head according to a second embodiment of the present invention.
Figure 7B:
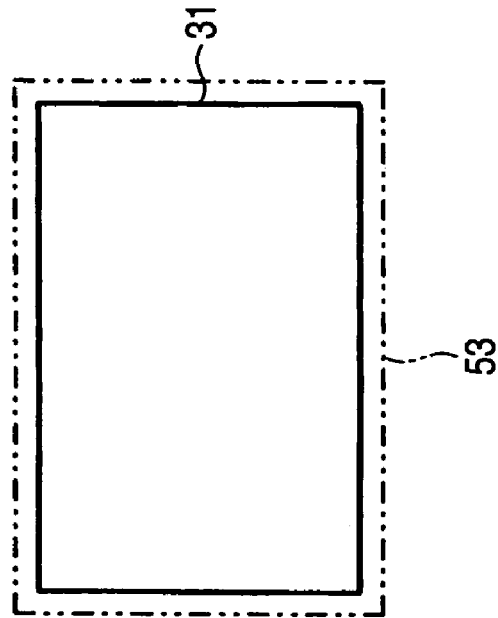
Figure 8:
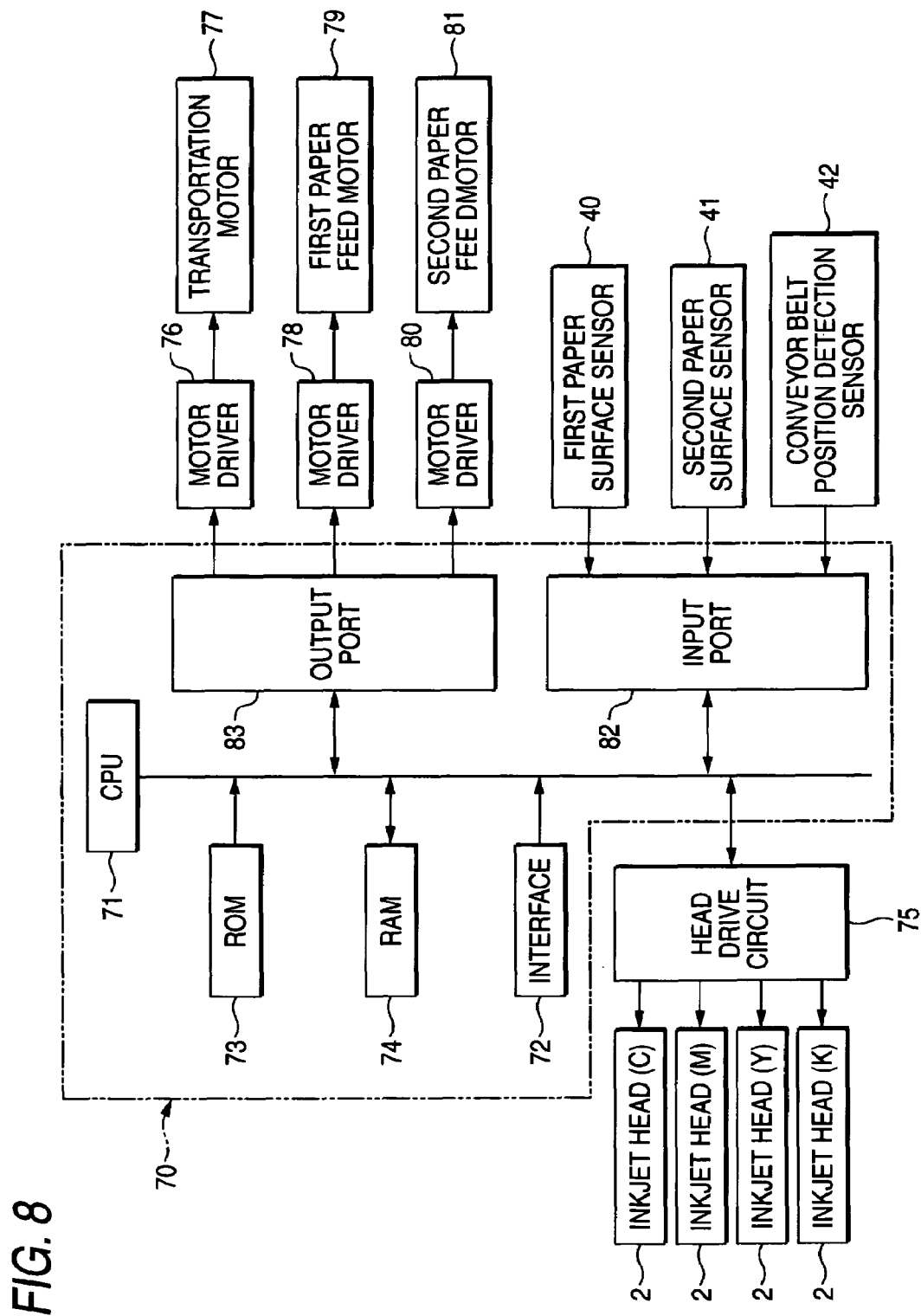
FIG. 8 is a partial plan view showing structures of first coil pieces and a magnetic layer of the thin film magnetic head shown in FIG. 7.

FIG. 7 is a partial front view of a thin film magnetic head 1B according to a second embodiment of the present invention and it is equivalent to FIG. 2; and FIG. 8 is a partial sectional view showing first coil pieces and raised layers formed under the first coil pieces of the thin film magnetic head 1B shown in FIG. 7 and it is equivalent to FIG. 4.

The thin film magnetic head 1B shown in FIGS. 7 and 8 has the same structure as that of the thin film magnetic head 1A shown in FIGS. 1 to 5. Therefore, in FIGS. 7 and 8, like reference characters designate like elements common to those in FIGS. 1 to 5 and the detail description is omitted.

As shown in FIGS. 7 and 8, in the thin film magnetic head 1B, the raised layer 80 is also formed on the coil insulating substrate-layer 34 formed on the lower core layer 29. The raised layer 80 is formed under the end regions 55a and 55b of the first coil pieces 55 substantially extending in the height direction from the surface opposing the recording medium so as to intersect under the end regions 55a and 55b of a plurality of the first coil pieces 55.

As shown in FIG. 7, the cross-section of the raised layer 80 in a direction parallel to the X-Z plane has a semi-circular or semi-ellipsoidal shape with a predetermined height h1. The height h1 denotes a size from the upper surface of the coil insulating substrate-layer 34 to the highest position of the raised layer 80.

As shown in FIGS. 7 and 8, the thin film magnetic head 1B is structured so that the end-faces 55c and 55d in the track width direction of the first coil pieces 55 are located on the upper surface of the raised layer 80. That is, the first coil pieces 55 are formed from the position, at which they are sandwiched between the raised layers 80, on the coil insulating substrate-layer 34 in the track width direction extending partway the raised layer 80.

As shown in FIGS. 7 and 8, the end regions 56a and 56b of the second coil pieces 56 are formed on the raised layers 80. The raised layer 80, as described above, has a predetermined height h1, so that the end regions 55a and 55b of the first coil pieces 55 formed on the raised layers 80 protrude upward higher than the center region 55f, and parts of the upper surfaces of the end regions 55a and 55b mounting on the raised layers 80 are exposed from the upper surface 36a of the coil insulating layer 36 so as to have an exposed surface as a connection surface 81. As shown in FIG. 7, the connection surface 81 is formed to be a flattening surface flush with the upper surface 36a of the coil insulating layer 36.

On the connection surfaces 81, the end regions 56a and 56b of the second coil pieces 56 are directly in touch so that the first coil pieces 55 and the second coil pieces 56 are electrically connected. That is, one end region 55a of the first coil pieces 55 is electrically connected to one end region 56a of the second coil pieces 56 in a direct contact state therewith on the connection surface 81. Likewise, the other end region 55b of the first coil pieces 55 is electrically connected to the other end region 56b of the second coil pieces 56 in a direct contact state therewith on the connection surface 81.

Even in the thin film magnetic head 1B structured in such a manner, the connection surfaces 81 can be exposed from the upper surface 36a of the coil insulating layer 36 so as to have a predetermined area. Thereby, the first coil pieces 55 can be electrically connected to the second coil pieces 56 in a direct contact state therewith, so that it is not necessary to form inclusions such as a connection layer and through-holes, reducing the electrical resistance.

Since the lower core layer 29 is not required to have a recess, the sectional area of the lower core layer 29 can be increased. Therefore, the magnetic saturation of the lower core layer 29 can be suppressed, enabling the magnetization efficiency to be improved.

Since the connection surface 81 is formed to be a flattening surface flush with the upper surface 36a of the coil insulating layer 36, the end regions 56a and 56b of the second coil pieces 56 can be securely and simply connected electrically to the connection surfaces 81. Therefore, the contact resistance between the first coil pieces 55 and the second coil pieces 56 can be suppressed. Also, on the coil insulating layer 36, the layered product 62 with a predetermined shape can be easily formed.

The end regions 55a and 55b of the first coil pieces 55, as shown in FIG. 7, are formed partway the surface of the raised layers 80 without outside extending across the raised layer 80 in the track width direction as shown in FIG. 2, so that during forming the first coil pieces 55, the upper surfaces of the end regions 55a and 55b mounting on the raised layers 80 are to be flattening surfaces in the same phase as the upper surface of the center region 55f, producing a phenomenon that the entire upper surfaces of the first coil pieces 55 are uniformed, which is so-called a leveling effect. However, the leveling effect can be suppressed and the end regions 55a and 55b can be formed on the raised layers 80 with a large film thickness. As a result, the connection surfaces 81 can be sufficiently raised upward in comparison with the upper surfaces 55e of the first coil pieces 55 embedded into the coil insulating layer 36, so that the insulation between the upper surfaces 55e of the first coil pieces 55 and the layered product 62 can be easily and sufficiently secured.

Figure 9:
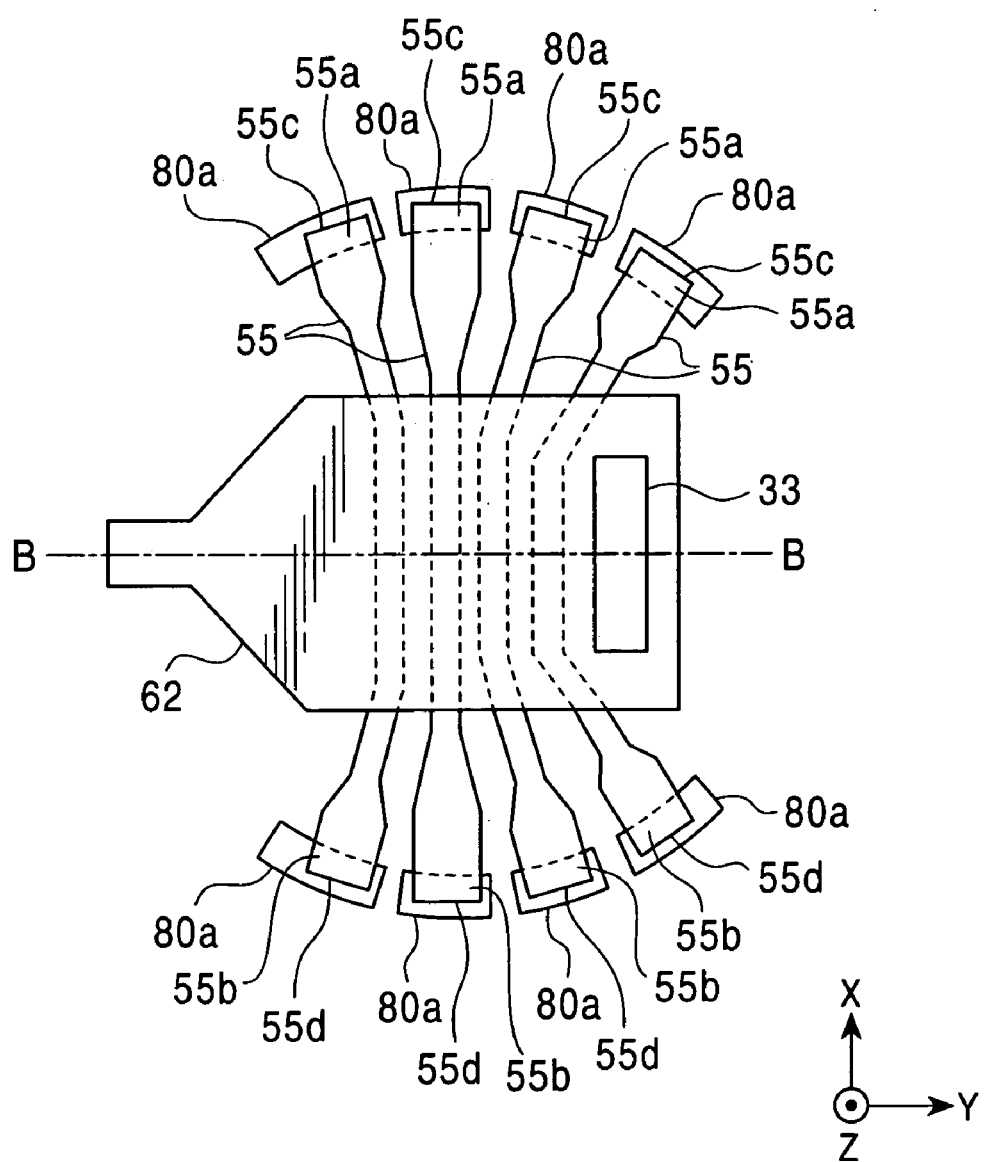
FIG. 9 is a partial plan view showing other structures of the first coil pieces and the magnetic layer of the thin film magnetic head shown in FIG. 7.

According to the embodiment shown in FIGS. 7 and 8, the raised layer 80 is formed with a predetermined width in a band shape substantially extending in the height direction; however, the present invention is not limited to this, and as shown in FIG. 9, the raised layer 80 may include a plurality of raised pieces 80a and the raised pieces 80a may be formed under the end regions 55a and 55b of the first coil pieces 55, respectively. Thereby, the end regions 55a and 55b of the first coil pieces 55 are raised by the respectively provided raised pieces 80a.

As shown in FIG. 8, it is rather preferable for manufacturing that the solid raised layers 80 extending in band shapes be arranged so as to intersect under the end regions 55a and 55b of the first coil pieces 55; however, as shown in FIG. 9, the raised layer 80 may be decoupled into a plurality of the raised pieces 80a.

Figure 10:
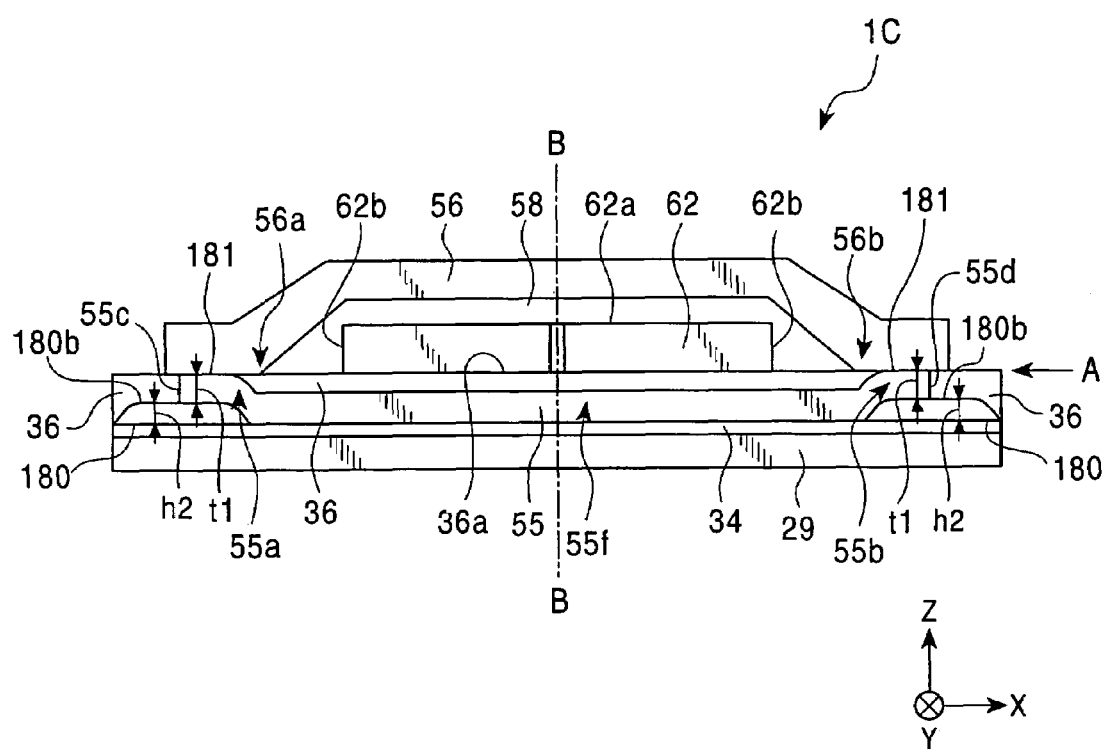
FIG. 10 is a partial front view of a thin film magnetic head according to a third embodiment of the present invention.
Figure 11:
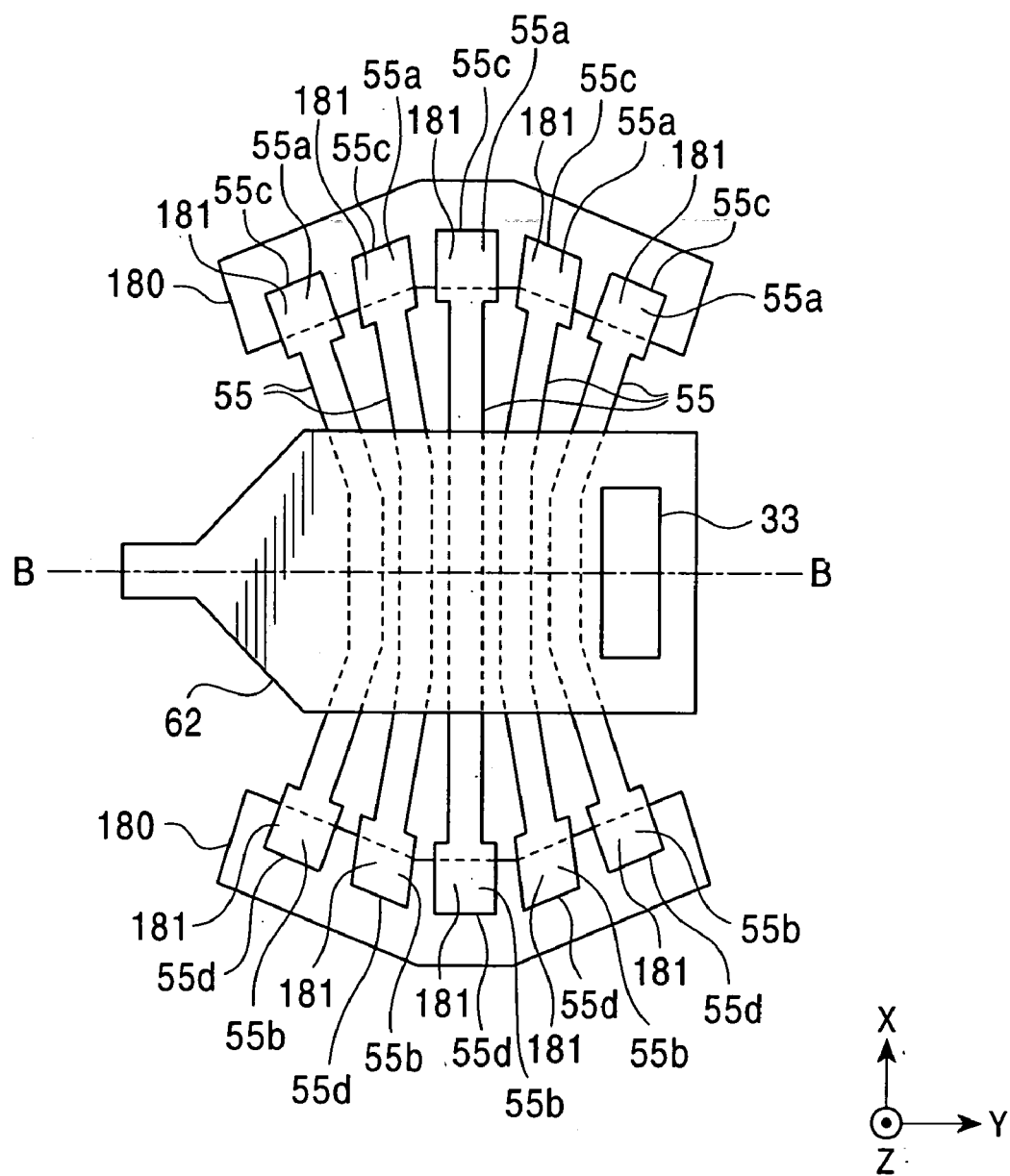
FIG. 11 is a partial plan view showing structures of first coil pieces and a magnetic layer of the thin film magnetic head shown in FIG. 10.

FIG. 10 is a partial front view of a thin film magnetic head 1C according to a third embodiment of the present invention and it is equivalent to FIG. 2; and FIG. 11 is a partial sectional view showing first coil pieces and raised layers formed under the first coil pieces of the thin film magnetic head 1C shown in FIG. 10 and it is equivalent to FIG. 4.

The thin film magnetic head 1C shown in FIGS. 10 and 11 has the same structure as that of the thin film magnetic head 1A shown in FIGS. 1 to 5. Therefore, in FIGS. 10 and 11, like reference characters designate like elements common to those in FIGS. 1 to 5 and the detail description is omitted.

As shown in FIGS. 10 and 11, in the thin film magnetic head 1C, band-shaped raised layers 180, each having a predetermined width, are formed on the coil insulating substrate-layer 34 at positions spaced in the track width direction from the center B-B in the track width direction. The raised layers 180, made of an organic insulating material such as a resist, are formed under the end regions 55a and 55b of the first coil pieces 55 substantially extending in the height direction from the surface opposing the recording medium so as to intersect the first coil pieces 55.

As shown in FIG. 10, the cross-section of the raised layer 180 in a direction parallel to the X-Z plane has a substantially trapezoid shape with a predetermined height h2. The height h2 denotes a size from the upper surface of the coil insulating substrate-layer 34 to the highest position of the raised layer 180.

As shown in FIG. 10, the upper surface 180b of the raised layer 180 is a flattening surface.

As shown in FIGS. 10 and 11, the end regions 55a and 55b of the first coil pieces 55 are formed on the raised layers 180, and the end-faces 55c and 55d in the track width direction of the first coil pieces 55 are positioned on the flattened upper surface 180b. That is, the first coil pieces 55 are formed from the position, at which they are sandwiched between the raised layers 180, on the coil insulating substrate-layer 34 in the track width direction to the partway the upper surface 180b of the raised layer 180. The raised layer 180, as described above, has a predetermined height h2, so that the end regions 55a and 55b of the first coil pieces 55 formed on the raised layers 180 protrude upward higher than the center region 55f, and at least parts of the upper surfaces of the end regions 55a and 55b mounting on the raised layers 180 are exposed from the upper surface 36a of the coil insulating layer 36 so as to have an exposed surface as a connection surface 181.

Since the upper surface 180b of the raised layer 180 is formed in a flattening surface, the end regions 55a and 55b of the first coil pieces 55 formed on the upper surfaces 180b are easily formed to have a large thickness t1. That is, on the upper surfaces 180b of the raised layers 180, the first coil pieces 55 are formed by a frame plating as will be described later. At this time, if the upper surface 180b of the raised layer 180 is formed in a flattening surface, the plating on the first coil pieces 55 is easily promoted in the Z-direction in the drawing, enabling the film thickness t1 to be increased. If the film thickness t1 is increased, while the area of the connection surfaces 181 may be easily defined, the film thickness of the coil insulating layer 36 formed between the first coil pieces 55 and the layered product 62 can be increased, so that the insulation between the first coil pieces 55 and the layered product 62 may be favorably maintained.

It is preferable that the connection surface 181 be formed in a flattening surface flush with the upper surface 36a of the coil insulating layer 36.

The bottom surfaces of the end regions 56a and 56b of the second coil pieces 56 are directly brought into contact on the connection surfaces 181 in an electrically connected state between the first coil pieces 55 and the second coil pieces 56. That is, one end region 55a of the first coil pieces 55 is electrically connected to one end region 56a of the second coil pieces 56 in a direct contact state therebetween on the connection surface 181. Likewise, the other end region 55b of the first coil pieces 55 is electrically connected to the other end region 56b of the second coil pieces 56 in a direct contact state therebetween on the connection surface 181.

In such a manner, in the thin film magnetic head 1C shown in FIGS. 10 and 11, the end regions 55a and 55b in the track width direction of the first coil pieces 55 and the end regions 56a and 56b in the track width direction of the second coil pieces 56, which vertically oppose each other in the film thickness direction of the layered product 62, are electrically connected together, respectively, in a direct contact state therebetween on the connection surfaces 181 so as to have a toroidal coil structure 57.

Even in the thin film magnetic head 1C structured in such a manner, the connection surfaces 181 can be securely exposed from the upper surface 36a of the coil insulating layer 36 so as to form the end regions 56a and 56b of the second coil pieces 56 on the connection surfaces 181 in a direct state. Thereby, it is not necessary to form inclusions such as a connection layer and through-holes, securing and simplifying the connection between the first coil pieces 55 and the second coil pieces 56 as well as reducing the electrical resistance.

Since the lower core layer 29 is not required to have a recess, the sectional area can be increased. Therefore, the magnetic saturation of the lower core layer 29 is suppressed, improving the magnetization efficiency.

Furthermore, as shown in FIGS. 10 and 11, since the raised layers 180 may be provided only on the required portions of the lower core layer 29, the film thickness of the coil insulating layer 36 can be increase at positions departing from the raised layers 180, so that the insulation performances can be sufficiently secured between the first coil pieces 55 and the second coil pieces 56 other than the connection surfaces 181 as well as between the first coil pieces 55 and the coil insulating layer 36.

Since the connection surface 181 is formed as a flattening surface flush with the upper surface 36a of the coil insulating layer 36, the end regions 56a and 56b of the second coil pieces 56 can be securely connected on the connection surfaces 181 so that the first coil pieces 55 are preferably connected to the second coil pieces 56. Also, the layered product 62 can be easily formed on the coil insulating layer 36 in a predetermined shape, so that the track width Tw determined by the width of the layered product 62 on the surface opposing the recording medium can be ensured with a high degree of accuracy.

Figure 12:
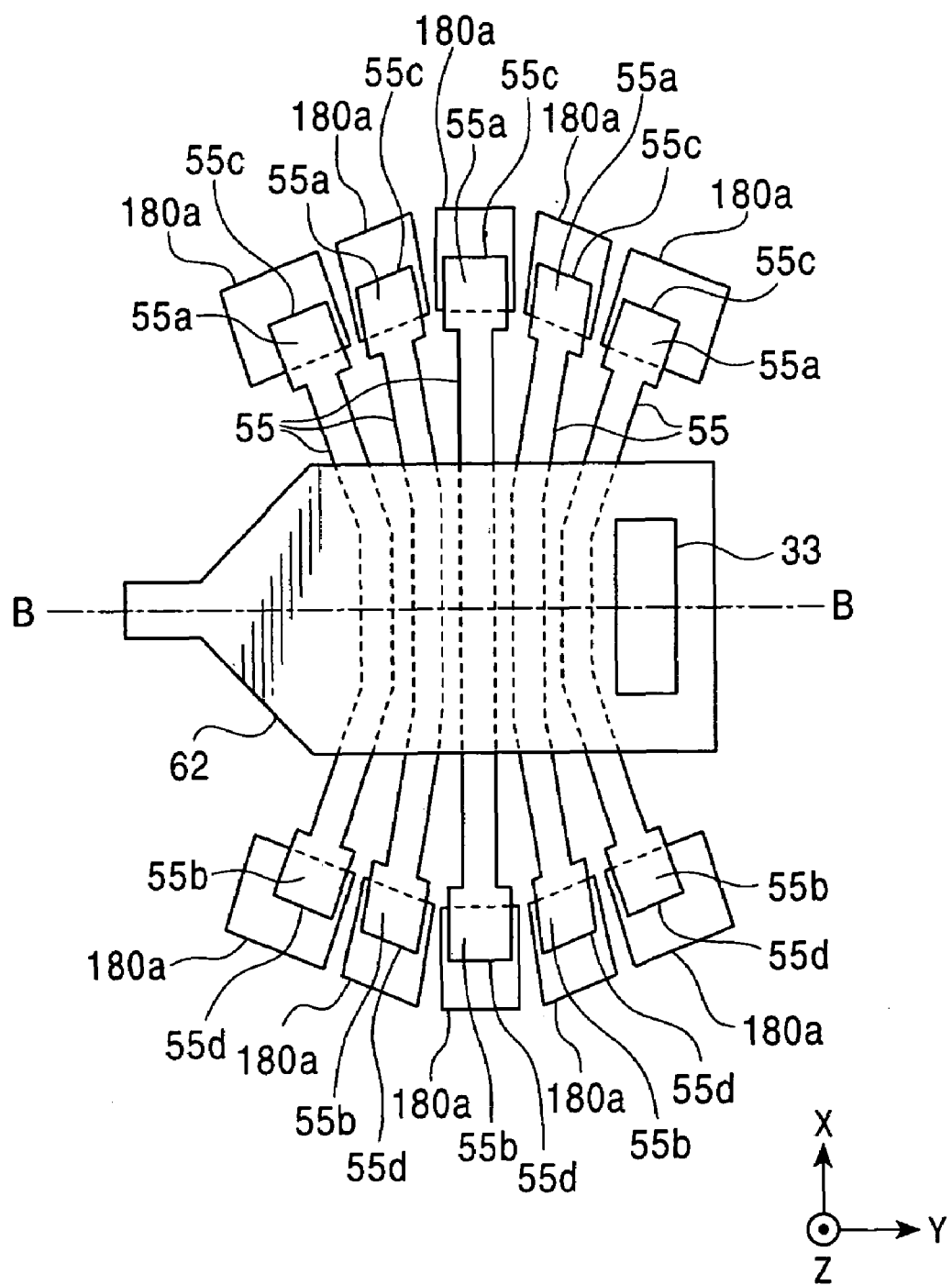
FIG. 12 is a partial plan view showing other structures of the first coil pieces and the magnetic layer of the thin film magnetic head shown in FIG. 10.

According to the embodiment shown in FIG. 11, the raised layer 180 is formed in a band shape with a predetermined width extending substantially in the height direction; however, the present invention is not limited to this, and as shown in FIG. 12, the raised layer 180 may also be decoupled into a plurality of raised pieces 180a, so that the raised pieces 180a upward raise the end regions 55a and 55b of the first coil pieces 55, respectively. If the integral raised layers 180 extending in a band shape, as shown in FIG. 12, are formed so as to intersect under the end regions 55a and 55b of a plurality of the first coil pieces 55, respectively, the manufacturing of the raised layers 180 is facilitated.

Also, as shown in FIG. 12, when the raised layers 180 are decoupled into the raised pieces 180a so as to form the end regions 55a and 55b of the first coil pieces 55 on the respective raised pieces 180a, spaces are produced between the adjacent raised pieces 180a, so that the coil insulating layer 36 can be formed with a thick film thickness on these portions, preferably securing the resistance performance between the adjacent end regions 55a and 55b of the first coil pieces 55.

When the upper surface 180a of the raised layer 180, as shown in FIGS. 10 and 11, is formed in a flattening surface, the end regions 55a and 55b of the first coil pieces 55 are easily formed to mount on the upper surfaces 180a and to have a predetermined film thickness t1. However, it is preferable that the both end-faces 55c and 55d of the first coil pieces 55 be partway the upper surfaces 180b of the raised layers 180. If the end-faces 55c and 55d might be formed to extend outside the raised layers 180 in the track width direction as shown in FIG. 2, the leveling effect would be liable to be produced and the film thickness t1 of the raised layers 180 mounting on the upper surfaces 180a of the raised layers 180 would be liable to be reduced. Therefore, in order to suppress the leveling effect, it is preferable that the first coil pieces 55 be formed only partway the upper surfaces 180b of the raised layers 180.

The above-mentioned leveling effect may be larger in the case where the first coil pieces 55 are mounted especially on the flattened upper surfaces 180b of the raised layers 180 with a substantially trapezoidal or rectangular cross-section as shown in FIG. 10 in comparison with the case where the first coil pieces 55 are mounted on the raised layers 80 with a curved surface as shown in FIG. 2. Therefore, in the case where the raised layers 80 with the curved surface are used, even if the first coil pieces 55 are extended outside across the raised layers 80 as shown in FIG. 2, the leveling effect may be smaller in comparison with the case where the raised layers 180 are used and the first coil pieces 55 are extended outside across the raised layers 180.

Figure 13:
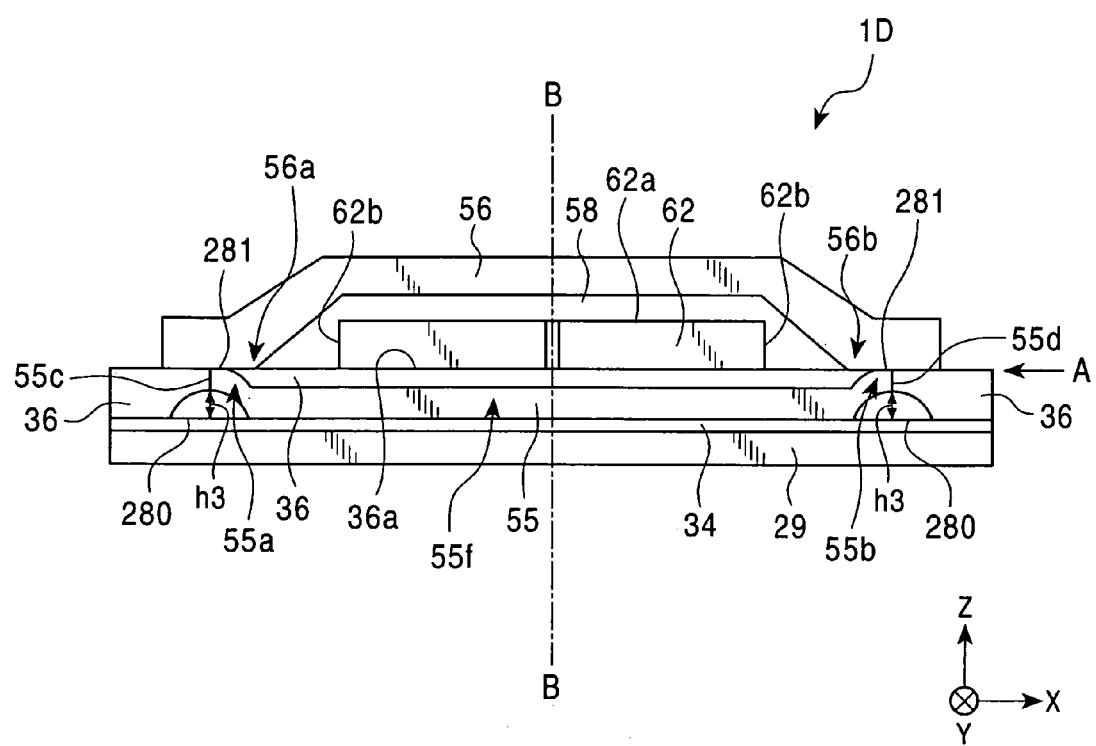
FIG. 13 is a partial front view of a thin film magnetic head according to a fourth embodiment of the present invention.
Figure 14:
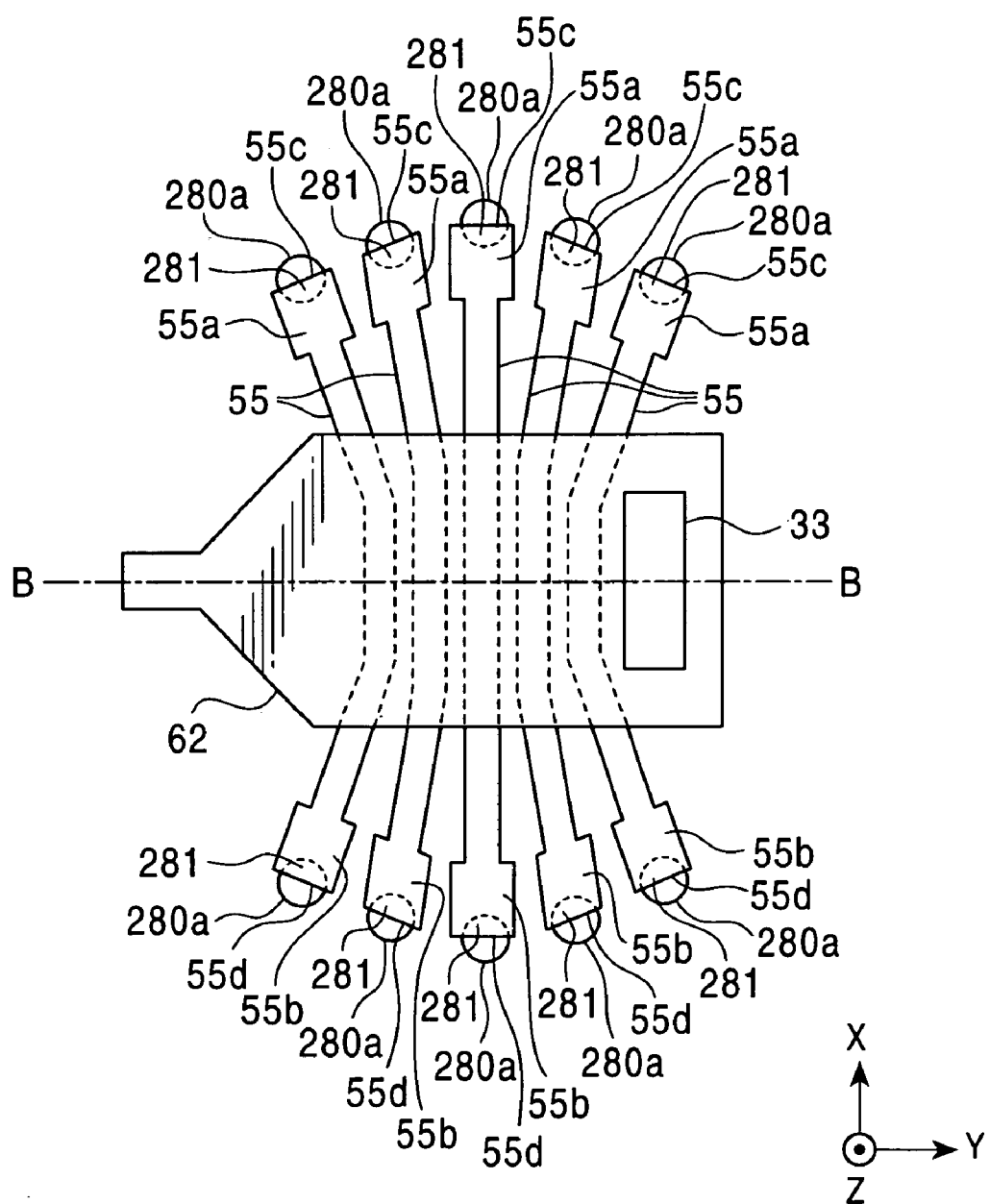
FIG. 14 is a partial plan view showing structures of first coil pieces and a magnetic layer of the thin film magnetic head shown in FIG. 13.

FIG. 13 is a partial front view of a thin film magnetic head 1D according to a fourth embodiment of the present invention and it is equivalent to FIG. 2; and FIG. 14 is a partial sectional view showing first coil pieces and raised layers formed under the first coil pieces of the thin film magnetic head 1D shown in FIG. 13 and it is equivalent to FIG. 4.

The thin film magnetic head 1D shown in FIGS. 13 and 14 has the same structure as that of the thin film magnetic head 1A shown in FIGS. 1 to 5. Therefore, in FIGS. 13 and 14, like reference characters designate like elements common to those in FIGS. 1 to 5 and the detail description is omitted.

As shown in FIGS. 13 and 14, in the thin film magnetic head 1D, raised layers 280 are also formed on the coil insulating substrate-layer 34 on the lower core layer 29 at positions spaced in the track width direction from the center B-B. The raised layers 280 includes a plurality of raised pieces 280a made of an organic insulating material such as a resist. The raised pieces 280a are formed under the end regions 55a and 55b of the first coil pieces 55, respectively.

As shown in FIGS. 13 and 14, the cross-section of the raised piece 280a has a hemispherical shape with a predetermined height h3. The height h3 denotes a size from the upper surface of the coil insulating substrate-layer 34 to the highest position of the raised piece 280a.

Figure 15:
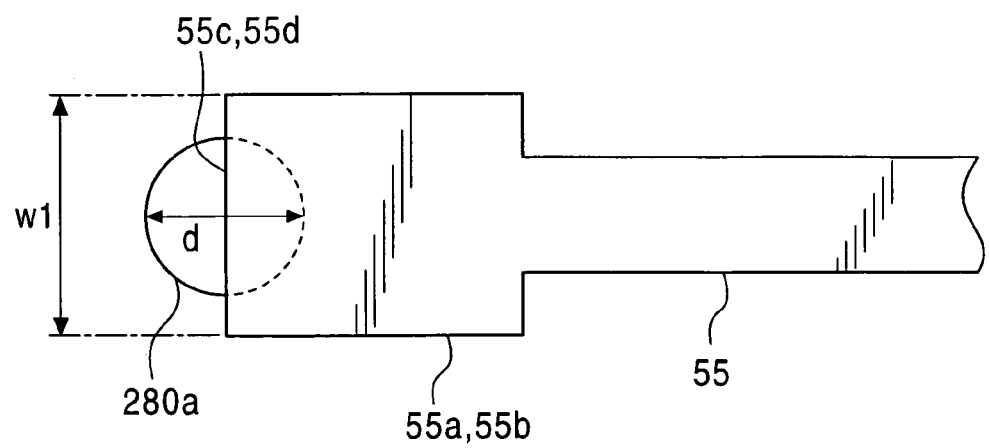
FIG. 15 is a partially enlarged plan view showing structures of the first coil pieces and a raised piece of the thin film magnetic head shown in FIG. 13.

FIG. 15 is a partially enlarged plan view of the first coil piece 55 and the raised piece 280a. In the thin film magnetic head 1D shown in FIGS. 13 and 14, the section in a direction parallel to the X-Y plane of the raised piece 280a has a substantially circular shape. As shown in FIG. 15, the diameter d of the raised piece 280a is smaller than the width w1 of the respective end regions 55a and 55b.

As shown in FIGS. 13 to 15, in the thin film magnetic head 1D, the end-faces 55c and 55d in the track width direction of the first coil pieces 55 are located on the surfaces 280b of the raised pieces 280a.

As shown in FIG. 13 or 14, at least parts of the end regions 55a and 55b of the first coil pieces 55 are formed to mount on the raised pieces 280a. The raised piece 280a, as described above, has a predetermined height h3, so that the end regions 55a and 55b of the first coil pieces 55 mounting on the raised pieces 280a protrude upward higher than the center region 55f of the first coil pieces 55, and parts of the end regions 55a and 55b of the first coil pieces 55 are exposed from the upper surface 36a of the coil insulating layer 36 at mounting positions on the raised pieces 280a so as to have an exposed surface as a connection surface 281.

It is preferable that the connection surface 281 be a flattening surface formed flush with the upper surface 36a of the coil insulating layer 36.

The end regions 56a and 56b of the second coil pieces 56 are directly brought into contact on the connection surfaces 281 in an electrically connected state between the first coil pieces 55 and the second coil pieces 56. That is, one end region 55a of the first coil pieces 55 is electrically connected to one end region 56a of the second coil pieces 56 in a direct contact state therebetween on the connection surface 181. Likewise, the other end region 55b of the first coil pieces 55 is electrically connected to the other end region 56b of the second coil pieces 56 in a direct contact state therebetween on the connection surface 281.

Also, in the thin film magnetic head 1D structured in such a manner, the connection surfaces 281 can be securely and simply exposed from the upper surface 36a of the coil insulating layer 36, so that by only bonding the end regions 56a and 56b of the second coil pieces 56 on the connection surfaces 281, the first coil pieces 55 and the second coil pieces 56 can be favorably connected together even without forming inclusions such as a connection layer and through-holes therebetween.

Since the lower core layer 29 is not required to have a recess, the sectional area of the lower core layer 29 can be increased. Therefore, the magnetic saturation of the lower core layer 29 can be suppressed, enabling the magnetization efficiency to be improved.

Since the connection surface 281 is formed as a flattening surface flush with the upper surface 36a of the coil insulating layer 36, the end regions 56a and 56b of the second coil pieces 56 can be securely bonded on the connection surfaces 281 while the layered product 62 can be formed on the coil insulating layer 36 in a predetermined shape, so that the track width Tw determined by the width of the layered product 62 on the surface opposing the recording medium can be ensured with a high degree of accuracy.

Figure 16:
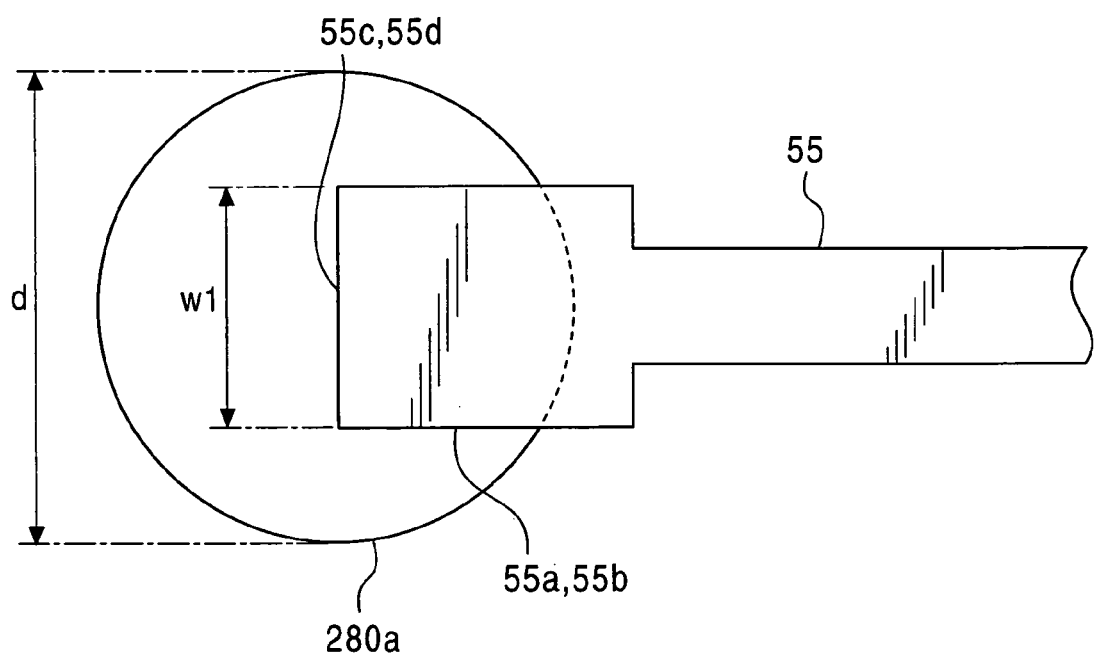
FIG. 16 is a partially enlarged plan view showing other structures of the first coil pieces and the raised piece of the thin film magnetic head shown in FIG. 13.

According to the embodiment shown in FIGS. 13 to 15, the diameter d of the raised piece 280a is smaller than the width w1 of the respective end regions 55a and 55b. However, the present invention is not limited to this, and as shown in FIG. 16, the diameter d of the raised piece 280a may be larger than the width w1 of the respective end regions 55a and 55b.

As shown in FIG. 15, if the diameter d of the raised piece 280a is smaller than the width w1 of the respective end regions 55a and 55b, the area of the end regions 55a and 55b mounting on the raised pieces 280a is reduced, so that the area of the connection surfaces 281 exposed from the upper surface 36a of the coil insulating layer 36 is also reduced. Therefore, for securing the connection between the second coil pieces 56 and the first coil pieces 55 by increasing the areas of the connection surfaces 281, it is preferable that the diameter d of the raised piece 280a be larger than the width w1 of the respective end regions 55a and 55b, as shown in FIG. 16. However, for reducing the leveling effect, as shown in FIG. 15, it may be preferable that the diameter d of the raised piece 280a be smaller than the width w1 of the respective end regions 55a and 55b.

The sectional shapes of the raised layer on planes parallel to the X-Z plane and the X-Y plane described with reference to FIGS. 1 to 15 are not limited to the shapes shown in these drawings, and may be other shapes. The material of the raised layer may include an organic insulating material such as a resist and an inorganic insulating material such as $Al_2O_3$ and $SiO_2$. When the surface is especially curved, as the raised layer 80 shown in FIG. 2, the organic insulating material such as the resist is preferable. In this case, after the resist is applied, the surface of the raised layer 80 can be curved by patterning and further heat-treating it. Also, in the case where the upper surface 180a is to be flattened, as the raised layers 180 shown in FIG. 10, the inorganic insulating material is preferable.

Figure 29:
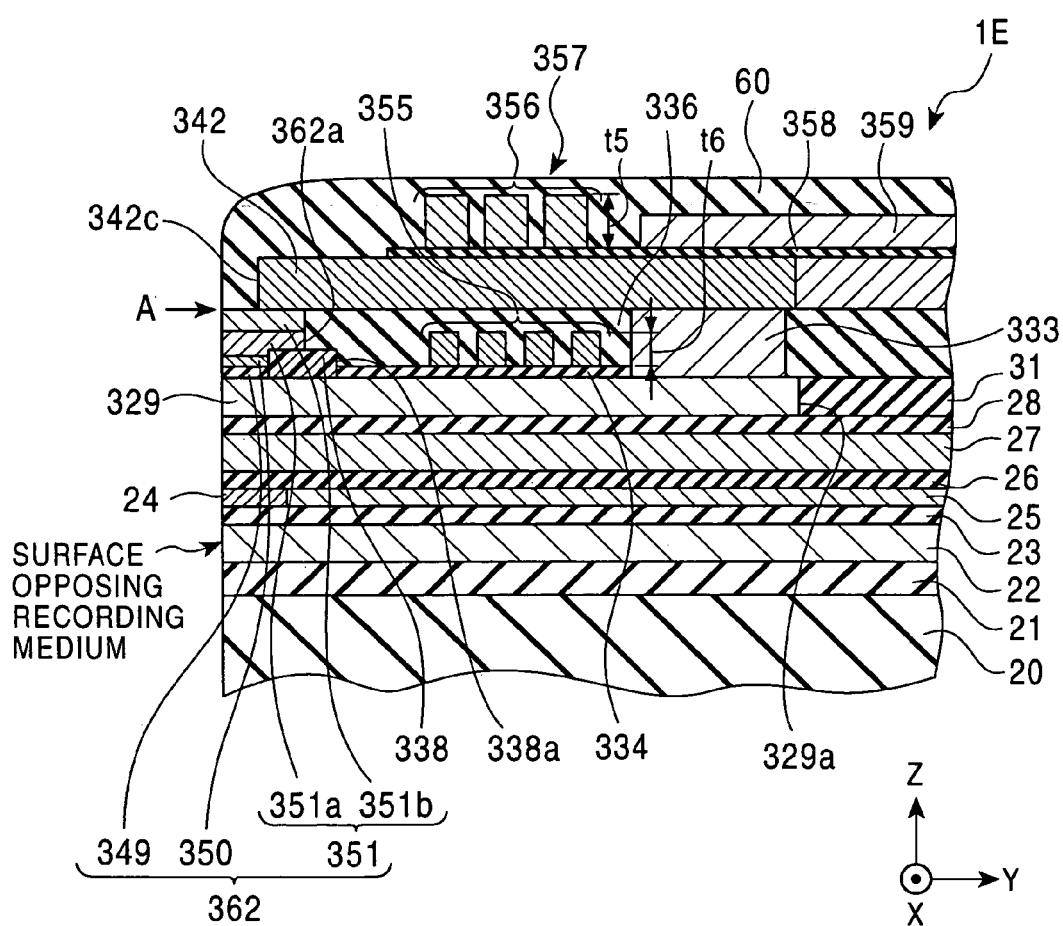
FIG. 29 is a longitudinal sectional view of a thin film magnetic head according to a fifth embodiment of the present invention.
Figure 30:
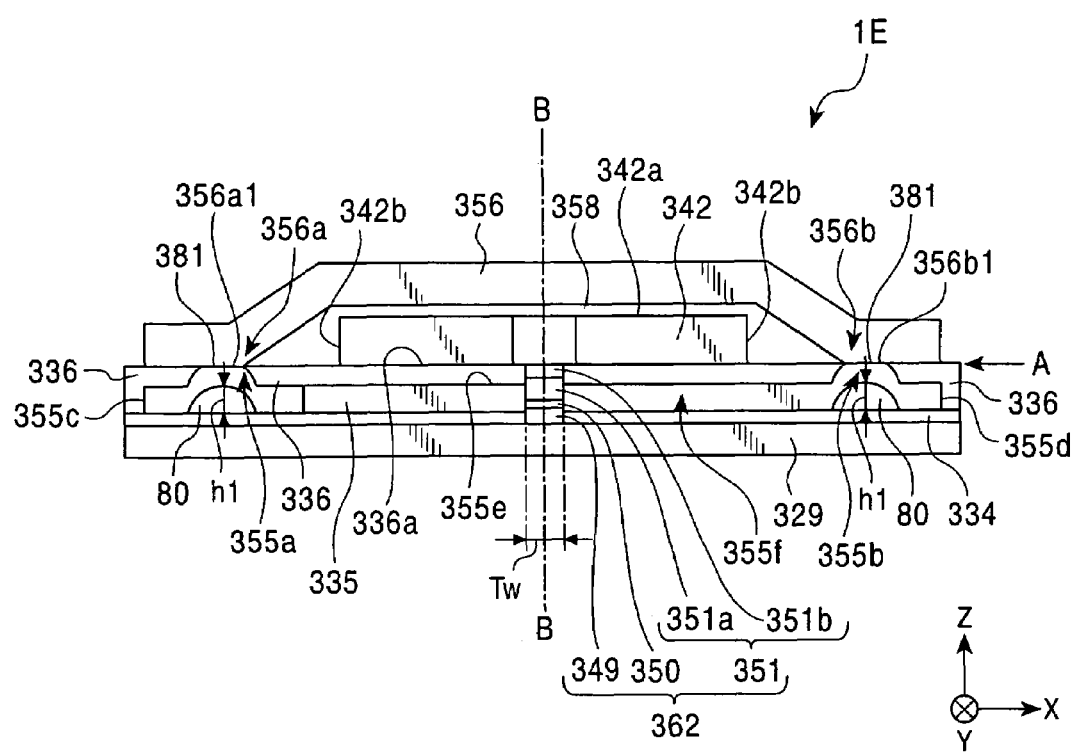
FIG. 30 is a partial front view of the thin film magnetic head shown in FIG. 29.
Figure 31:
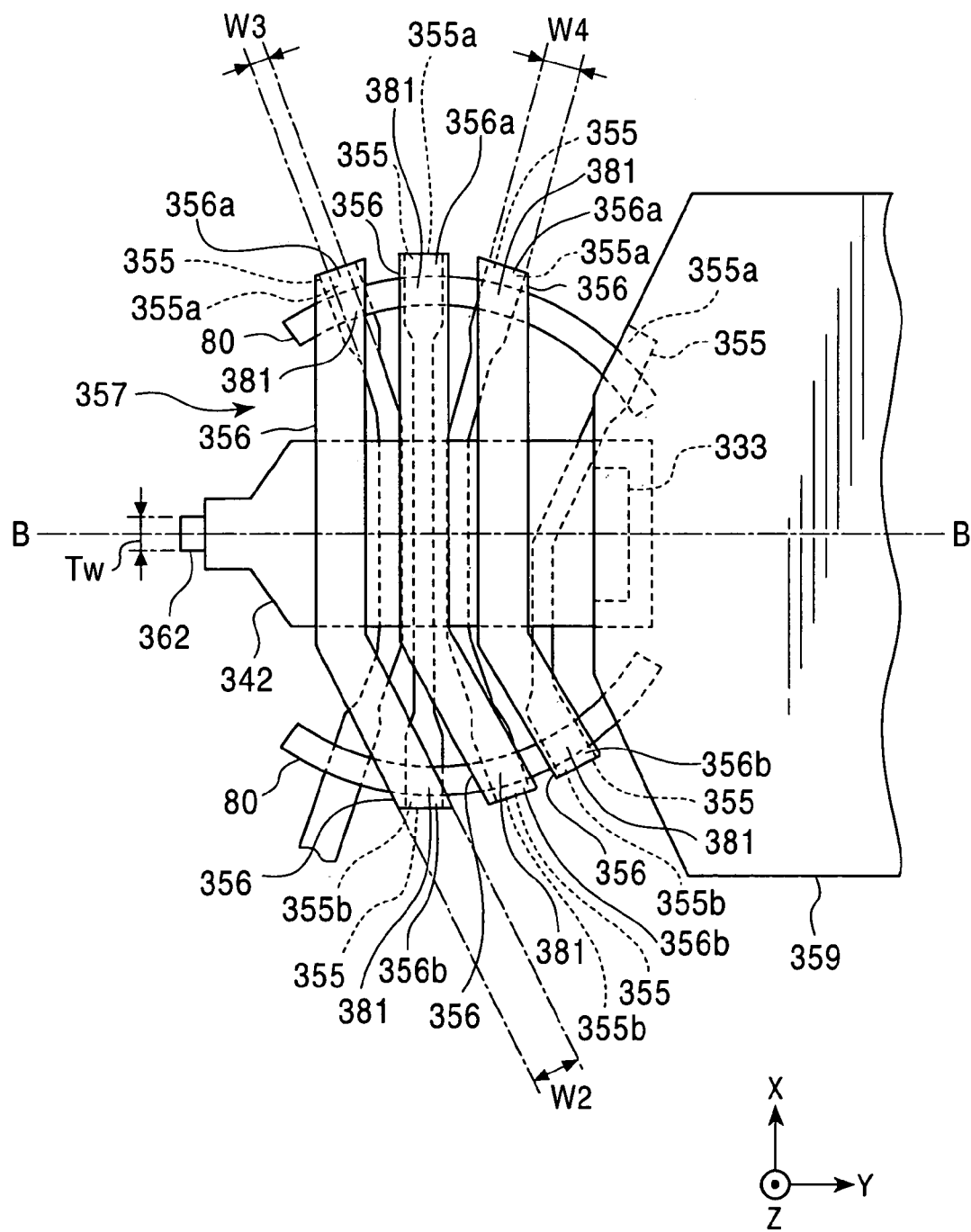
FIG. 31 is a partial plan view showing structures of first coil pieces, second coil pieces, and a magnetic layer of the thin film magnetic head shown in FIG. 29.
Figure 32:
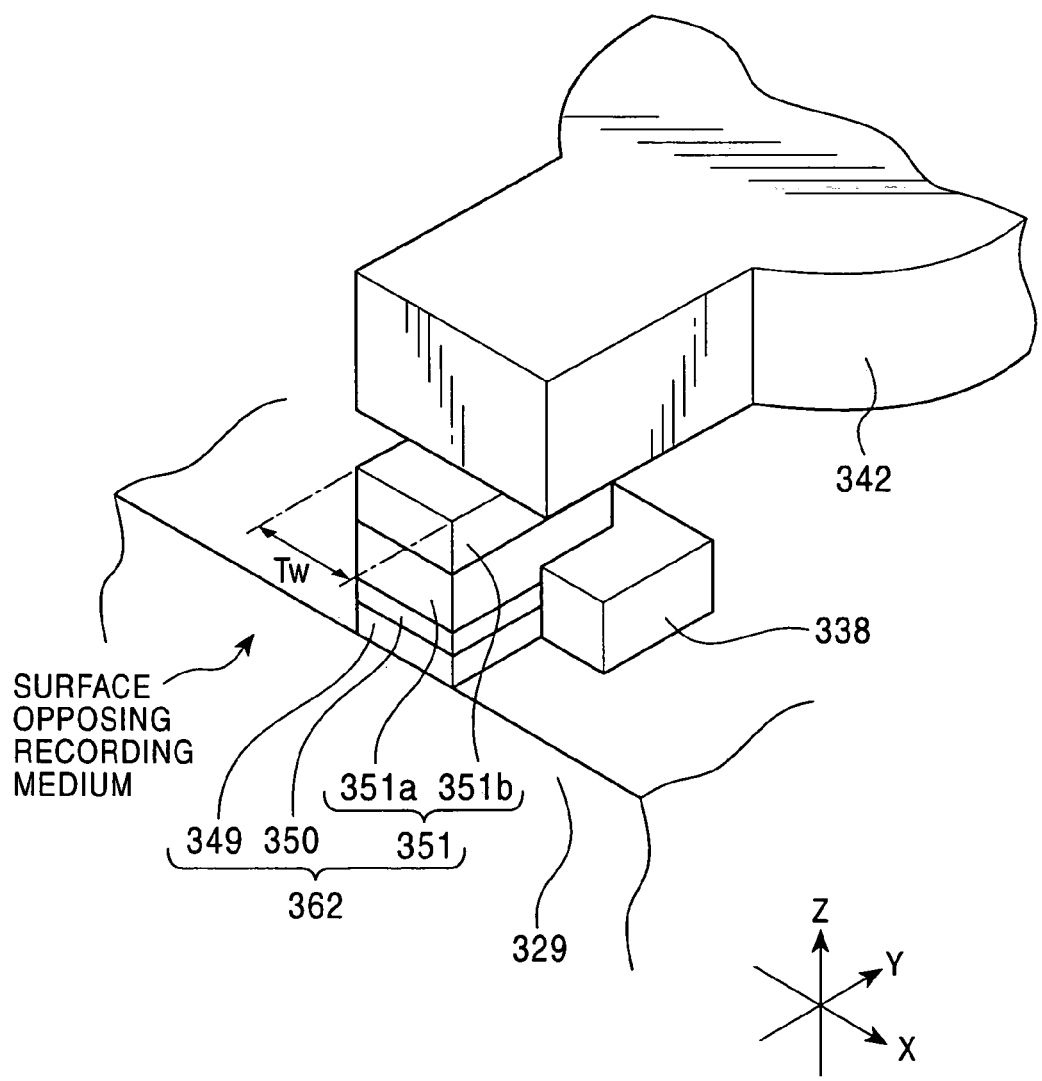
FIG. 32 is a partially enlarged perspective view of the thin film magnetic head shown in FIG. 29.
Figure 33:
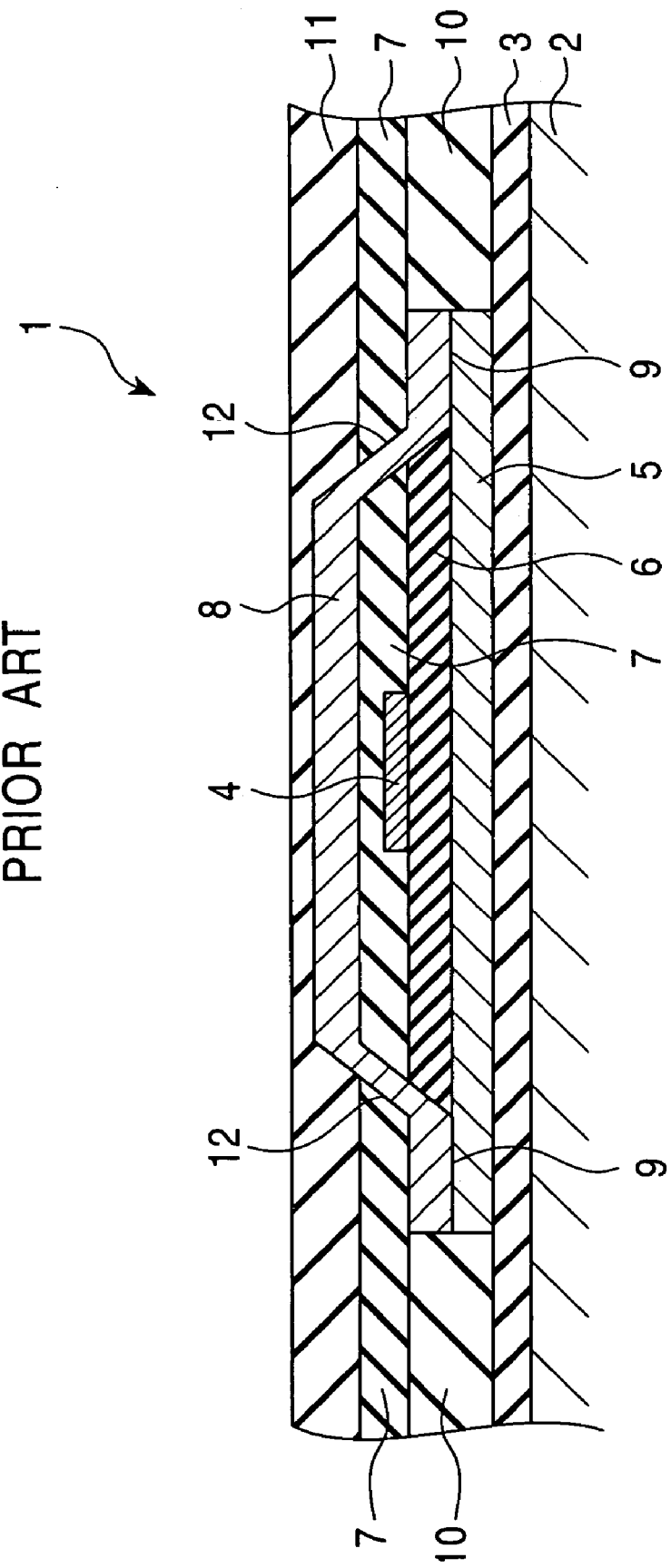
FIG. 33 is a partial front view of a conventional thin film magnetic head.

FIG. 29 is a partial sectional view of a thin film magnetic head 1E according to a fifth embodiment of the present invention; FIG. 30 is a partial front view of the thin film magnetic head 1E shown in FIG. 29 showing a magnetic pole tip layer 362, which will be described later, first coil pieces, second coil pieces, which are formed mostly adjacent to an opposing surface to a recording medium, and other layers opposing the former layers in the film thickness direction viewed from the opposing surface to the recording medium by removing a reproducing head (MR head), including from the lower shielding layer 22 to the upper shield layer 27, and the protection layer 60 from the drawing; FIG. 31 is a partial plan view of the thin film magnetic head 1E shown in FIG. 29; and FIG. 32 is a partially enlarged perspective view showing part of the structure of the thin film magnetic head 1E shown in FIG. 29.

Among components of the thin film magnetic head 1E, the reproducing head (also referred to as the MR head) including from the lower shielding layer 22 to the upper shield layer 27 is the same as those of the thin film magnetic heads 1A, 1B, 1C, and 1D respectively according to the first to fourth embodiments. Also, in the same components as those of the thin film magnetic head 1A shown in FIGS. 1 to 5 among the other components of the thin film magnetic head 1E shown in FIGS. 29 to 32, like reference characters designate like elements common thereto, and the detail description is omitted.

As shown in FIG. 29, on the upper shield layer 27, the separation layer 28 made of a material such as $Al_2O_3$ is formed. Alternatively, a lower core layer 329 may be formed on the upper gap layer 26 by eliminating the upper shield layer 27 and the separation layer 28. In this case, the lower core layer 329 also serves as the upper shield layer 27.

In the configuration shown FIG. 29, on the separation layer 28, the lower core layer 329 is formed. The lower core layer 329, made of a magnetic material such as an Ni—Fe alloy, is formed to have a predetermined length extending in the height direction (the Y-direction in the drawings) from the surface opposing the recording medium. At the rear in the height direction of a rear end-face 329a of the lower core layer 329 and also on both sides of the lower core layer 329 in the track width direction (the X-direction in the drawings), there is provided the non-magnetic insulating material layer 31. As shown in FIG. 29, the surfaces of the lower core layer 329 and the non-magnetic insulating material layer 31 are continuous flattening surfaces.

As shown in FIG. 29, on the lower core layer 329, a magnetic pole tip layer 362 is formed to have a predetermined length extending in the height direction from the surface opposing the recording medium. The magnetic pole tip layer 362 is made to have a track width Tw extending the track width direction (the X-direction in the drawings). The track width Tw is 0.5 μm or less, for example.

According to the embodiment shown in FIG. 29, the magnetic pole tip layer 362 is constituted of a lower magnetic polar layer 349, a gap layer 350, and an upper magnetic polar layer 351 so as to have a three-film layered structure. The upper magnetic polar layer 351, the lower magnetic polar-layer 349, and the gap layer 350 will be described below.

On the lower core layer 329, the lower magnetic polar layer 349 is formed by plating as the bottom layer of the magnetic pole tip layer 362. The lower magnetic polar layer 349, made of a magnetic material, is magnetically connected to the lower core layer 329. The lower magnetic polar layer 349 may be made of either the same as or different from the material of the lower core layer 329, and may be formed in an either single film layer or multi-film layer.

On the lower magnetic polar layer 349, the nonmagnetic metallic gap layer 350 is deposited. The surface of the lower magnetic polar layer 349 is preferably plated therewith. The nonmagnetic metallic material may preferably include one or two of NiP, NiReP, NiPd, NiW, NiMo, NiRh, NiRe, Au, Pt, Rh, Pd, Ru, and Cr. The gap layer 350 may be formed in an either single film layer or multi-film layer.

On the gap layer 350 plated is the upper magnetic polar layer 351 that is magnetically connected to an upper core layer 342, which will be described later. According to the embodiment, the upper magnetic polar layer 351 has a deposited structure including a lower layer 351a and an upper layer 351b. The lower layer 351a and the upper layer 351b are made of magnetic materials. The saturated magnetic induction density of the lower layer 351a is lager than that of the upper layer 351b.

When the gap layer 350 is made of a nonmagnetic metallic material, as mentioned above, the lower magnetic polar layer 349, the gap layer 350, and the upper magnetic polar layer 351 can be continuously plated.

Furthermore, a back gap layer 333 is formed at a position separated from a rear end-face 362a in the height direction of the magnetic pole tip layer 362 by a predetermined distance in the height direction (the Y-direction in the drawings).

The back gap layer 333, made of a magnetic material, may be made of either the same as or different from the material of the lower core layer 329. The back gap layer 333 may be formed in an either single film layer or multi-film layer. The back gap layer 333 is magnetically connected to the lower core layer 329.

As shown in FIG. 29, on the lower core layer 329, a Gd settle layer 338 is formed at a position separated from the surface opposing the recording medium by a predetermined distance in the height direction (the Y-direction in the drawings). Also, as shown in FIG. 29, the rear end of the upper magnetic polar layer 351 is placed on the Gd settle layer 338. A gap depth (Gd) is determined by the length of the gap layer 350 from the surface opposing the recording medium to the point abutting the Gd settle layer 338 in the height direction.

A coil insulating substrate layer 334 is formed between a rear end-face 338a in the height direction of the Gd settle layer 338 and the back gap layer 333 on the lower core layer 329. On the coil insulating substrate layer 334, a plurality of first coil pieces 355 extending in the track width direction (the X-direction in the drawings) and arranged in the height direction.

The first coil pieces 355 are embedded with a coil insulating layer 336 made of an inorganic insulating material such as $Al_2O_3$. As shown in FIG. 29, upper surfaces of the magnetic pole tip layer 362, the coil insulating layer 336, and the back gap layer 333 are continuous flattening surfaces extending along a reference surface A shown in FIG. 29.

The upper magnetic polar layer 351 and the back gap layer 333 are plated with an upper core layer (magnetic layer) 342. The upper core layer 342 directly or indirectly connects the lower core layer 329 in the height direction to the magnetic pole tip layer 362 via the back gap layer 333, and the upper core layer 342 corresponds to a magnetic layer according to the present invention.

The upper magnetic polar layer 351 may be made of the same material as that of the upper core layer 342; however, it is more preferable that it be made of a material different from that of the upper core layer 342. In particular, it is preferable that the saturated magnetic induction density of the upper core layer 342 be the same as or lower than that of the upper layer 351b of the upper magnetic polar layer 351. The saturated magnetic induction density of the upper core layer 342 is 1.4 to 1.9 T, for example; that of the lower layer of the upper magnetic polar layer 351 is 1.9 to 2.4 T; and that of the upper layer is 1.4 to 1.9 T, for example.

When the saturated magnetic induction density of the upper core layer 342 is lower than that of the upper magnetic polar layer 351, it is easily prevented to magnetically recording with a leakage field from the upper core layer 342.

As shown in FIGS. 29 and 30, an insulating layer 358, made of an inorganic insulating material such as $Al_2O_3$ and $SiO_2$ or an organic insulating material such as a resist, is formed along a region extending from the upper surface 342a of the upper core layer 342 to both sides end-faces 342b and 342b in the track width direction. On the insulating layer 358, a plurality of the second coil pieces 56 are arranged in the height direction extending from the track width direction (the X-direction in the drawings) to the track width direction (the Y-direction in the drawings).

In the thin film magnetic head 1E shown in FIGS. 29 to 32, the upper surfaces 355e of the first coil pieces 355 are also covered with the coil insulating layer 336, in the same way as that of the thin film magnetic head 1A shown in FIGS. 1 to 5. However, the entire upper surfaces 335e are not covered with the coil insulating layer 336 but connection surfaces 381 between the first coil pieces 355 and the second coil pieces 356 are formed to be flattening surfaces flush with the upper surface 336a of the coil insulating layer 336.

As shown in FIG. 31, on the lower core layer 29, in the same way as that of the thin film magnetic head 1A shown in FIGS. 1 to 5, the raised layers 80 are formed at positions separated in the track width direction from the center B-B of the track width direction in the thin film magnetic head 1E. The raised layer 80, having a predetermined width, is formed in a band shape so as to intersect under the first coil pieces 55. The raised layer 80 is made of an organic insulating material such as a resist, as mentioned above.

The first coil pieces 355 are formed in regions extending from on the coil insulating substrate layer 334 to on the raised layers 80. Therefore, the end regions 355a and 355b of the first coil pieces 355 formed on the raised layers 80 protrude upward higher than a center region 355f. In the same way as that of the thin film magnetic head 1A shown in FIGS. 1 to 5, parts of the end regions 355a and 355b mounting on the raised layers 80 are exposed from the upper surface 336a of the coil insulating layer 336 so as to have an exposed surface as the connection surface 381.

According to the embodiment shown in FIG. 31, the end regions 355a and 355b of the first coil pieces 355 extend in directions separating from the center line B-B further than the raised layers 80 so as to be located outside the raised layers 80 in the track width direction.

As shown in FIG. 30, the cross-section of the raised layer 80 in a direction parallel to the X-Z plane has a semi-circular or semi-ellipsoidal shape with a predetermined height h1. Accordingly, the upper surface of the raised layer 80 is a curved surface.

The height h1 denotes a size from the upper surface of the coil insulating substrate-layer 34 to the highest position of the raised layer 80.

Since the raised layer 80 has a predetermined height h1 as mentioned above, as shown in FIG. 30, the end regions 355a and 355b of the first coil pieces 355 formed on the raised layers 80 protrude upward higher than the other regions, so that parts of the upper surfaces of the first coil pieces 55 can be formed to be the connection surfaces 381 at positions mounting on the raised layers 80.

The connection surface 381 is preferable to be a flattening surface flush with the upper surface 336a of the coil insulating layer 336 covering the upper surfaces 355e of the first coil pieces 355 other than the connection surfaces 381. Such a flattening surface is formed by a polishing method such as a CMP technique. As shown in FIGS. 30 and 31, end regions 356a and 356b of the second coil pieces 356 are directly brought into contact on the connection surfaces 381 in an electrically connected state. That is, one end region 355a of the first coil pieces 355 is electrically connected to one end region 356a of the second coil pieces 356 in a direct contact state therewith on the connection surface 381. Likewise, the other end region 355b of the first coil pieces 355 is electrically connected to the other end region 356b of the second coil pieces 356 in a direct contact state therewith on the connection surface 381.

Also, a leading layer 359 is formed in the rear of the second coil piece 356 formed at the mostly rear in the height direction, and is electrically connected to the first coil piece 355 formed at the mostly rear on the connection surfaces 381 in a direct contact state therewith.

In such a manner, in the thin film magnetic head 1E shown in FIGS. 29 to 32, the end regions 355a and 355b in the track width direction of the first coil pieces 355 and the end regions 356a and 356b in the track width direction of the second coil pieces 56, which vertically oppose each other in the film thickness direction of the upper core layer 342, are electrically connected together, respectively, in a direct contact state therewith on the connection surfaces 381 so as to have a toroidal coil structure 357.

The end region 356b of the second coil pieces 356 connected to the end region 355b of the first coil pieces 355 shown on the right of FIG. 30 shows a state that the end region 355b of the first coil pieces 355 positioned behind by one piece (the Y-direction in the drawings) the first coil pieces 355 shown in the drawing is electrically connected to the end region 356b of the second coil pieces 356 shown in the drawing.

When a recording current is applied to the coil structure 357, a recording magnetic field is induced in the lower core layer 329 and the upper core layer 342 so-as to produce a leakage field in between the lower magnetic polar layer 349 and the upper magnetic polar layer 351, which oppose each other with the gap layer 350 therebetween, thereby recording a magnetic signal on a recording medium such as a hard disk.

In the thin film magnetic head 1E, since the first coil pieces 355 and the second coil pieces 356 are electrically connected together, respectively, in a direct contact state without intervening inclusions such as a connection layer, the electrical resistance due to the inclusions is not produced. Since the raised layers 80 are formed under the end regions 355a and 355b of the first coil pieces 355 so as to raise the end regions 355a and 355b upward higher than the center region 355f, even when the coil insulating layer 336 is formed on the upper surfaces 355e of the first coil pieces 355, as long as the coil insulating layer 336 is polished by the CMP, the connection surfaces 381 to the second coil pieces 356 can be simply exposed, eliminating to form through-holes on the coil insulating layer 336. If the through-holes are assumed to form on the coil insulating layer 336, etching might be needed. Since it is difficult to form the through-holes by the etching at precise positions and depths with a high degree of accuracy, the positional displacement of the through-holes reduces contact areas between the first coil pieces 355 and the second coil pieces 356, and increases the electrical resistance, thereby producing heat in connection portions between the first coil pieces 55 and the second coil pieces 356. Also, a problem arises in that forming the through-holes damages the end regions 355a and 355b of the first coil pieces 355.

Whereas, in the thin film magnetic head 1E, the connection surface 381 is determined by the position at which the raised layer 80 is formed, enabling the connection surface 381 to be formed at a precise position with a high-degree of accuracy because the raised layer 80 is formed by photo-etching. Also, during polishing the coil insulating layer 336 by the CMP technique, the connection surface 381 can be exposed so as to have a predetermined exposed area by adjusting the scraping amount. Therefore, the excellent connections between the first coil pieces 355 and the second coil pieces 356 are enabled, suppressing the increase in electrical resistance.

Furthermore, since a recess is not necessary to be provided in the lower core layer 29, the sectional area of the lower core layer 29 can be increased. Accordingly, the magnetic saturation of the lower core layer 29 is suppressed, improving the magnetization efficiency.

As according to the embodiment, by providing the band-shaped raised layer 80 only on the required portions of the lower core layer 29, not only the insulation performances between the first coil pieces 355 and the second coil pieces 356 other than the connection surfaces 381, between the first coil pieces 355, and between the upper core layers 342 but also the insulation performances between the lower core layer 29 and the second coil pieces 56 and between the lower core layer 29 and the second coil pieces 356 on regions outside the end-faces 355c and 355d of the first coil pieces 355 and between the upper core layers 342 can be easily assured with a sufficient film thickness by the coil insulating layer 336 covering the upper surfaces 355e of the first coil pieces 355.

Since the connection surface 381 is formed as a flattening surface flush with the upper surface 336a of the coil insulating layer 336, the end regions 356a and 356b of the second coil pieces 356 can be easily mounted on the connection surfaces 381 so that the first coil pieces 355 are preferably connected to the second coil pieces 356. Therefore, the contact resistance between the first coil pieces 355 and the second coil pieces 356 can be further suppressed. Since the upper surface 336a of the coil insulating layer 336 is a flattening surface, the upper core layer 342 can be easily formed on the coil insulating layer 336 in a predetermined shape.

In order to improve the connection to the second coil pieces 356 by increasing the area of the connection surfaces 381, it is at least preferable that widths of the end regions 355a and 355b of the first coil pieces 355 at positions mounting on the raised layers 80, be larger than the width of the center region 355f. Also, the area of the connection surfaces 381 may be smaller than the area of the bottom surfaces 356a1 and 356b1 of the end regions 356a and 356b in the second coil pieces 356 at positions mounting on the connection surfaces 381 and the coil insulating layer 336. However, since if it is too small, the electrical resistance increases, it is preferable that the area of the connection surfaces 381 be within a range of 50% to 100% of the area of the bottom surfaces 356a1 and 356b1 of the end regions 356a and 356b in the second coil pieces 356 at positions mounting on the connection surfaces 381 and the coil insulating layer 336.

In the thin film magnetic head 1E shown in FIGS. 29 to 32, the material of the upper core layer 342 differs from that of the upper magnetic polar layer 351 of the magnetic pole tip layer 362 so that only the upper magnetic polar layer 351 is made of a material with a high saturated magnetic induction density while the upper core layer 342 can be made of a material with a saturated magnetic induction density lower than that of the upper magnetic polar layer 351. Since the upper magnetic polar layer 351 and the lower magnetic polar layer 349, both having a high saturated magnetic induction density, are not formed in the rear of the Gd settle layer 338, the magnetic induction density may be appropriately adjusted, reducing the magnetic flux leakage from both sides of the magnetic pole tip layer 362 so as to improve an S/N ratio of the magnetic head.

Also, by retracting the front end-face 342c of the upper core layer 342 in the height direction further than the surface opposing the recording medium, the magnetic flux leakage from the upper core layer 342 can be further reduced.

In the thin film magnetic head 1E, as shown in FIG. 29, by increasing the film thickness t5 of the second coil piece 356 larger than the film thickness t6 of the first coil piece 355 as well as by increasing the length w2 of the second coil piece 356 in a first direction perpendicular to the current flowing direction larger than the length w3 of the first coil piece 355 in the first direction, the electric resistance can be reduced. That is, the heat produced in the coil structure 357 can be reduced, enabling the protrusion of the vicinity of the magnetic pole tip layer 362 toward the recording medium to be reduced.

If the length w2 is increased larger than the length w4 of the end regions 355a and 355b of the first coil pieces 355, the heat produced in the coil structure 357 can be further reduced, so that the protrusion of the vicinity of the magnetic pole tip layer 362 toward the recording medium can be further preferably reduced.

In the thin film magnetic head 1E shown in FIGS. 29 to 32, the flattened upper core layer 342 connects between the upper surfaces of the magnetic pole tip layer 362 and the back gap layer 333 so as to form a magnetic path length, so that the magnetic path length can be reduced in comparison with a magnetic head with the heaped-up upper core layer 342. Also, when the upper core layer 342 is flattened, Joule heat produced from the coil structure 357 can be efficiently dissipated outside the magnetic head.

Furthermore, the coil structure 357 has the toroidal structure winding about the upper core layer 342.

Therefore, even when the number of turns of the coil structure 357 constituting the magnetic head is reduced, predetermined recording characteristics can be maintained. Since the coil resistance is reduced by reducing the number of turns, the heat produced in the magnetic head can be suppressed during driving the magnetic head.

When the heat produced in the magnetic head is suppressed, the protrusion of the vicinity of the magnetic pole tip layer 362 from the surface opposing the recording medium can be suppressed.

Moreover, using an inorganic insulating material for the coil insulating layer 336 covering the coil structure 357 reduces the coefficient of thermal expansion of the magnetic head.

In the thin film magnetic head 1E shown in FIGS. 29 to 32, the raised layer 80 is formed in a band shape with a predetermined width extending substantially in the height direction so as to intersect under a plurality of the first coil pieces 355; however, the present invention is not limited to this, and in the same way as that shown in FIG. 6, the raised layer 80 may be composed of a plurality of raised pieces 80a that are arranged under the respective first coil pieces 355 so that the raised pieces 80a upward raise the end regions 355a and 355b of the first coil pieces 355, respectively.

In the same way as that shown in FIGS. 7 and 8, the cross-section of the raised layer 80 in a direction parallel to the X-Z plane may have a semi-circular or semi-ellipsoidal shape with a predetermined height h1 so that the end-faces 355c and 355d in the track width direction of the first coil pieces 55 may be located on the upper surface of the raised layer 80. That is, the first coil pieces 355 may be formed from the position, at which they are sandwiched between the raised layers 80, on the coil insulating substrate-layer 334 in the track width direction extending partway the raised layer 80.

In the same way as that shown in FIG. 9, the raised layer 80 may include a plurality of raised pieces 80a and the raised pieces 80a may be formed under the end regions 355a and 355b of the first coil pieces 355, respectively. Thereby, the end regions 355a and 355b of the first coil pieces 355 are raised by the respectively provided raised pieces 80a.

The cross-section of the raised layer 80 of the thin film magnetic head 1E in a direction parallel to the X-Z plane may have a substantially trapezoid shape with a predetermined height h2, so as to be structured as the raised layer 180 shown in FIG. 10 or 11, in which the upper surface 180b is flattened. In this case, in the same way as that shown in FIG. 10 or 11, the end regions 355a and 355b of the first coil pieces 355 are formed on the raised layers 180, and the end-faces 355c and 355d in the track width direction of the first coil pieces 355 are positioned on the flattened upper surface 180b of the raised layers 180. That is, the first coil pieces 355 may also be formed from the position, at which they are sandwiched between the raised layers 180, on the coil insulating substrate-layer 334 in the track width direction to the partway the upper surface 180b of the raised layer 180.

In the case where the raised layer 80 of the thin film magnetic head 1E is structured as the raised layers 180, in the same way as that shown in FIG. 12, the raised layer 180 may also be decoupled into a plurality of raised pieces 180a, so that the raised pieces 180a upward raise the end regions 355a and 355b of the first coil pieces 355, respectively.

As shown in FIGS. 13 and 14, the raised layer 80 of the thin film magnetic head 1E may be structured as the raised pieces 280a each having a hemispherical shape with a predetermined height h3. In this case, in the same way as that shown in FIG. 15, the diameter d of the raised piece 280a is smaller than the width w1 of the respective end regions 355a and 355b so that the end-faces 355c and 355d in the track width direction of the first coil pieces 355 are positioned at positions higher than the surfaces 280b of the raised pieces 280a.

Also, in the case where the raised layer 80 of the thin film magnetic head 1E is structured as the raised pieces 280a, in the same way as that shown in FIG. 16, the diameter d of the raised piece 280a may also be larger than the width w1 of the respective end regions 355a and 355b of the first coil pieces 355.

A manufacturing method of the thin film magnetic head 1A will be described with reference to FIGS. 17 to 28. A forming method of the layers from the lower core layer 29 to the second coil pieces 56 shown in FIG. 1 will be described. The manufacturing process charts shown in FIGS. 17 to 28 are longitudinal sectional views (i.e., sectional views at a plane parallel to the Y-Z plane in the drawings) of the thin film magnetic head in mid course of manufacturing.

Figure 17:
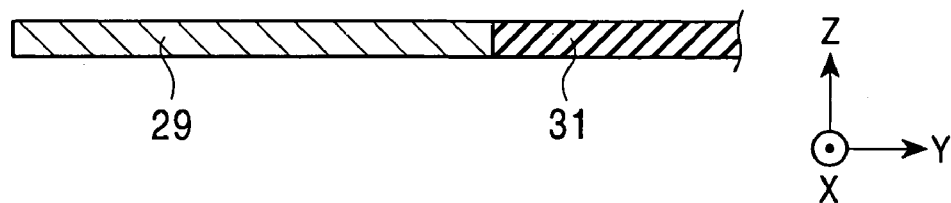
FIG. 17 is a process drawing showing a manufacturing method the thin film magnetic head shown in FIG. 1.

In the process shown in FIG. 17, first, after the lower core layer 29 made of an Ni—Fe alloy is formed by plating while the non-magnetic insulating material layer 31 is formed of $Al_2O_3$, the surfaces of the lower core layer 29 and the non-magnetic insulating material layer 31 are polished by the CPM technique.

Figure 18:
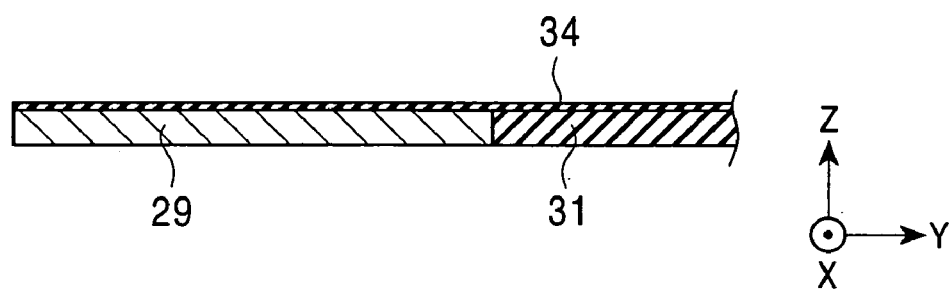
FIG. 18 is a drawing of a process to be performed next to that shown in FIG. 17.

In the process shown in FIG. 18, the coil insulating substrate-layer 34 made of $Al_2O_3$ or $SiO_2$ is formed on the surfaces of the lower core layer 29 and the non-magnetic insulating material layer 31 by sputtering.

Figure 19:
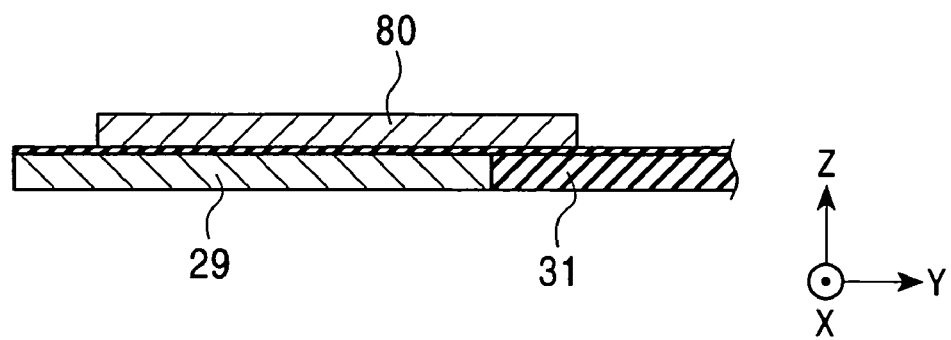
FIG. 19 is a drawing of a process to be performed next to that shown in FIG. 18.

Then, the process shown in FIG. 19 is executed. FIG. 19 is a partial longitudinal sectional view of the thin film magnetic head at a plane different from those of FIGS. 17 and 18, showing the section of the raised layer 80 at the line C-C halving the size in the width direction (the X-direction in the drawings) viewed from a direction parallel to the Y-Z plane.

As shown in FIG. 19, on the surface of the coil insulating substrate-layer 34, the raised layer 80 shown in FIGS. 2 and 4 and having a predetermined height h1 is formed with an insulating material such as a resist. The raised layer 80 may be formed by a photo-etching method.

Since the raised layer 80 has a semi-circular or semi-ellipsoidal shape in the section viewed in the arrow direction of FIG. 2, the surface of the raised layer 80 is curved.

Figure 20:
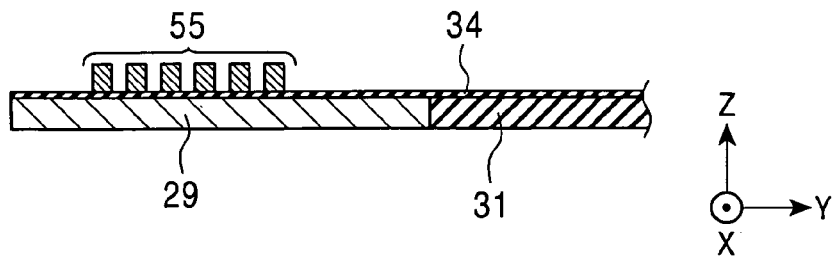
FIG. 20 is a drawing of a process to be performed next to that shown in FIG. 19.
Figure 21:
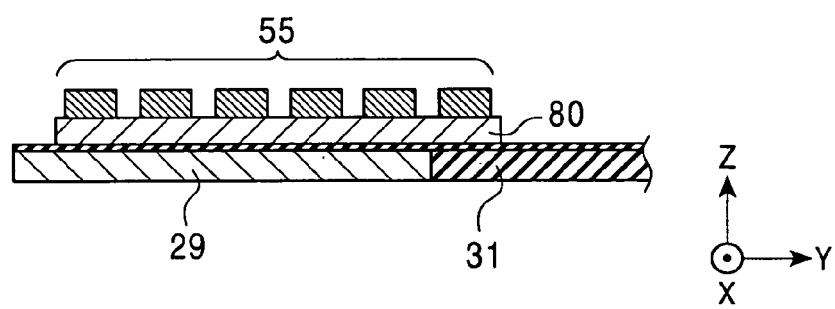
FIG. 21 is a drawing of a process to be performed next to that shown in FIG. 19.

Next, the processes shown in FIGS. 20 and 21 will be executed. FIG. 21 is a partial longitudinal sectional view of the thin film magnetic head at a plane different from that of FIG. 20 at the position corresponding to FIG. 19.

In the process shown in FIG. 20, on the coil insulating substrate-layer 34, a plurality of the first coil pieces 55 are formed, which are arranged in the height direction. At this time, as shown in FIG. 21, at least parts of the end regions 55a and 55b of the first coil pieces 55 mount on the raised layer 80. At this time, as shown in FIG. 4, parts of the end regions 55a and 55b of the first coil pieces 55 are located outside the raised layer 80 in the track width direction. The first coil piece 55 is made by plating of a non-magnetic conductive material such as Cu.

Since the first coil pieces 55 are formed along regions from the coil insulating substrate-layer 34 to the raised layers 80, as shown in FIG. 2, the end regions 55a and 55b of the first coil pieces 55 are raised upward higher than the center region 55f.

Figure 22:
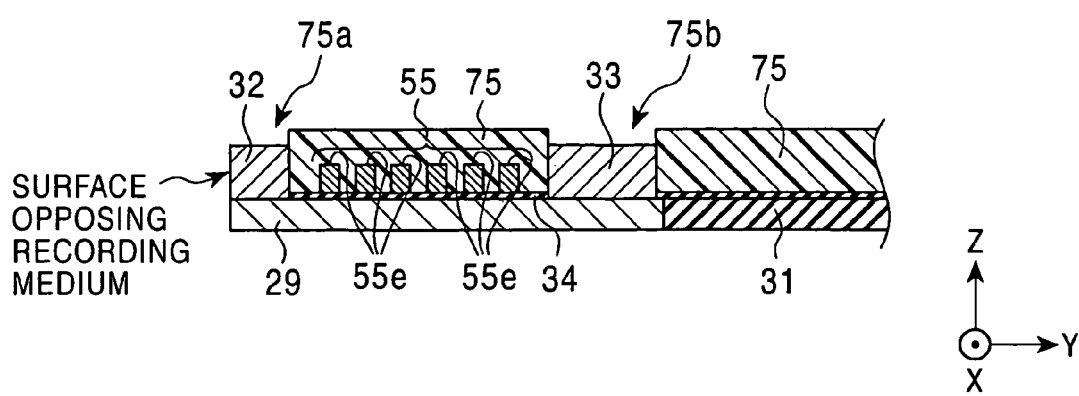
FIG. 22 is a drawing of a process to be performed next to those shown in FIGS. 20 and 21.

In the process shown in FIG. 22, the coil insulating substrate-layer 34 is coated with a resist layer 75 that is exposed and developed so as to form holes 75a and 75b. The hole 75a is formed in a region from the surface opposing the recording medium to the piece nearest to the opposing surface among the first coil pieces 55 while the hole 75b is formed in the vicinity of the anchor of the lower core layer 29. After removing the coil insulating substrate-layer 34 exposed from the holes 75a and 75b by etching, on the lower core layer 29 exposed from the hole 75a, the upheaval layer 32 is formed by plating while during the same process, on the anchor of the lower core layer 29 exposed from the hole 75b, the back gap layer 33 is formed by plating. The upheaval layer 32 and the back gap layer 33 are made of a magnetic material, and may be made of the same as or different from the material of the lower core layer 29. The upheaval layer 32 and the back gap layer 33 may be single-layered or multi-layered. Between the upheaval layer 32, the back gap layer 33, and the lower core layer 29, there is not the lower core layer 29, and these layers are magnetically connected together.

Then, the upheaval layer 32, the back gap layer 33, and the upper surfaces 55e of the first coil pieces 55 are covered with an inorganic insulating material such as $Al_2O_3$ so as to form the coil insulating layer 36.

After the process shown in FIG. 19, in the process shown in FIG. 22, the upheaval layer 32 and the back gap layer 33 are formed, and then, the first coil pieces 55 may also be formed in the process shown in FIG. 20.

Figure 23:
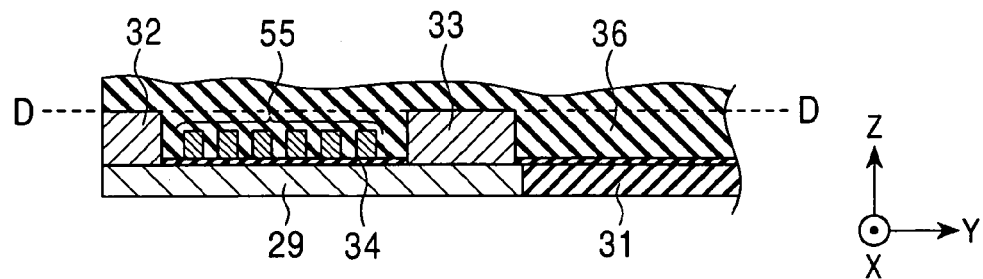
FIG. 23 is a drawing of a process to be performed next to that shown in FIG. 22.
Figure 24:
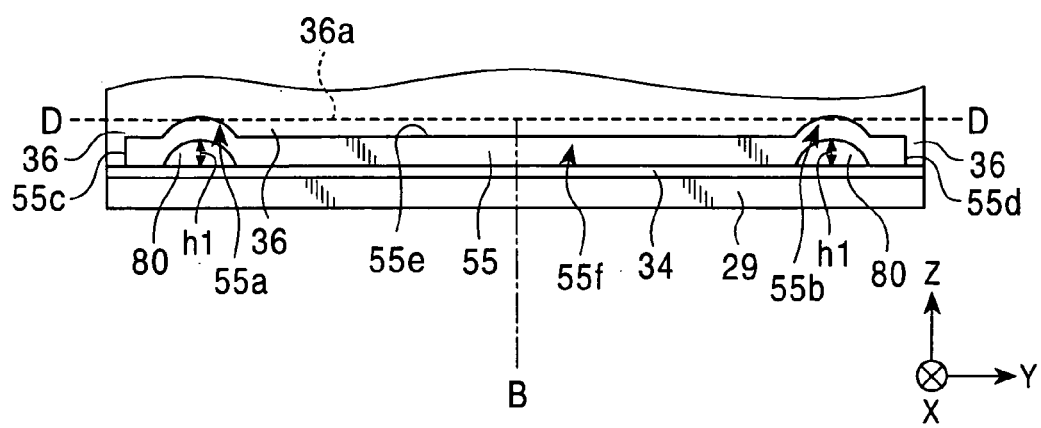
FIG. 24 is a drawing of another process to be performed next to that shown in FIG. 22.
Figure 25:
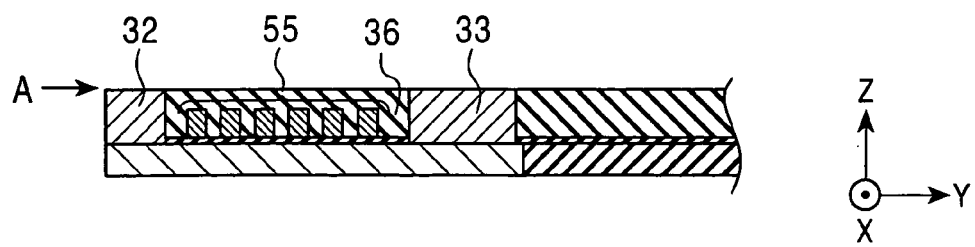
FIG. 25 is a partial longitudinal sectional view showing a completion state of the process shown in FIG. 23.
Figure 26:
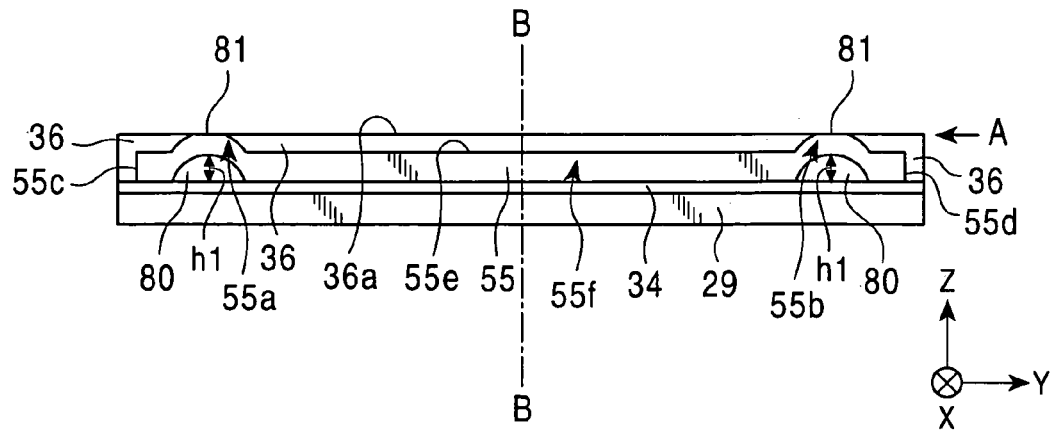
FIG. 26 is a partial front view showing a completion state of the process shown in FIG. 23.

Next, the processes shown in FIGS. 23 and 24 are executed. FIG. 24 is a front view of the state shown in FIG. 23 viewed from the surface opposing the recording medium in the same position as that shown in FIG. 2. As shown in FIGS. 23 and 24, the coil insulating layer 36, the upheaval layer 32, and the back gap layer 33 are polished to the D-D line shown in the drawing from the direction parallel to the X-Y direction of the drawing by the CPM technique. At this time, when the layers mentioned above are polished to the certain extent, parts of the end regions 55a and 55b of the first coil pieces 55 are exposed from the upper surface 36a of the coil insulating layer 36. The exposed surfaces of the end regions 55a and 55b are the connection surfaces 81 to the second coil pieces 56, and by the amount of polishing, the exposed area of the connection surfaces 81 can be restricted. When the exposed area of the connection surfaces 81 becomes a predetermined area, the polishing is stopped at that time. When the polishing is performed by the CPM, the amount of the polishing is easily controlled. FIGS. 25 and 26 show the completion of the polishing. FIG. 26 is the same front view as FIG. 24.

Referring to FIGS. 25 and 26, the upper surfaces of the upheaval layer 32, the coil insulating layer 36, and the back gap layer 33 are formed as flattening surfaces along the reference surface A. As shown in FIG. 26, the first coil pieces 55 other than the connection surfaces 81 are completely embedded into the coil insulating layer 36. As shown in FIGS. 24 and 26, it is preferable that the connection surfaces 81 be also flattened in the same way as that of the upper surface of the coil insulating layer 36. In order to suitably perform the polishing, it is necessary to form the coil insulating layer 36 with an inorganic insulating material such as $Al_2O_3$. This is because that if the coil insulating layer 36 might be formed with an organic insulating material, even when the above polishing is applied thereto, it is difficult to appropriately flatten the material because of a sticky property of the organic insulating material.

Figure 27:
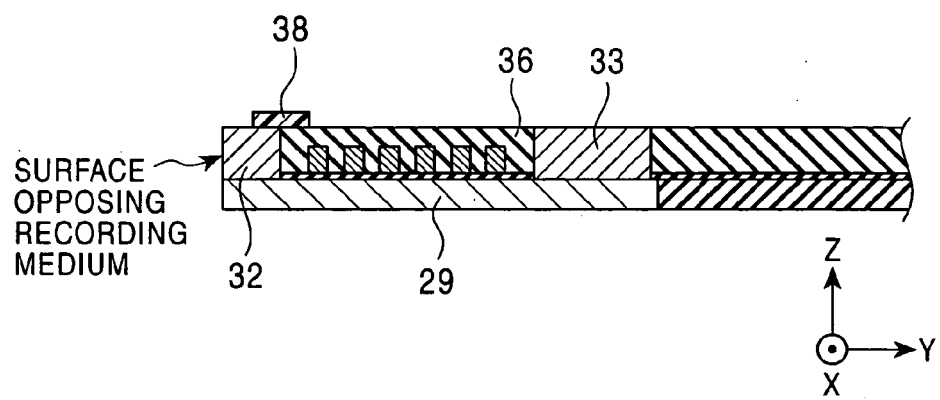
FIG. 27 is a drawing of a process to be performed next to that shown in FIG. 23.

Then, as shown in FIG. 27, the Gd settle layer 38 is formed with an inorganic insulating material or an organic insulating material at a position separated from the surface opposing the recording medium by a predetermined distance in the height direction (the Y-direction in the drawings).

Figure 28:
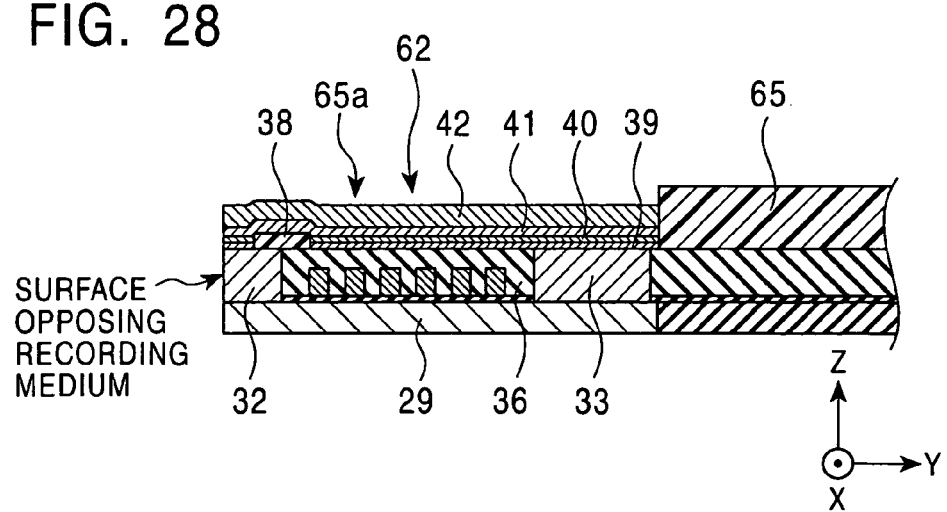
FIG. 28 is a drawing of a process to be performed next to that shown in FIG. 25.

Next, in the process shown in FIG. 28, after a plating seed film (not shown) required for plating is formed with an Ni—Fe alloy or a Fe—Co alloy, a resist layer 65 is formed having a pattern 65a composed of the front end B and the rear end C with the plan view shown in FIG. 5, for example. Within the pattern 65a, the lower magnetic polar layer 39, the gap layer 40, the upper magnetic polar layer 41, and the upper core layer 42 are continuously plated from beneath in that order.

The planar shapes of the lower magnetic polar layer 39, the upper magnetic polar layer 41, and the upper core layer 42 are composed of the elongated front end B extending from the surface opposing the recording medium in the height direction (the Y-direction in the drawings) and the rear end C with the track width direction (the X-direction in the drawings) spreading from the both sides anchor B1 in the height direction. At this time, the track width Tw is restricted by the width of the upper magnetic polar layer 41 in the track width direction (the X-direction in the drawings) on the opposing surface. Then, the resist layer 65 is removed.

In this process shown in FIG. 28, the layered product 62 composed of the lower magnetic polar layer 39, the gap layer 40, the upper magnetic polar layer 41, and the upper core layer 42 can be effectively formed on the flattened coil insulating layer 36, the upheaval layer 32, and the back gap layer 33. That is, the layered product 62 can be formed on the coil insulating layer 36, the upheaval layer 32, and the back gap layer 33 so as to have a predetermined shape with a high degree of accuracy, thereby forming the track width Tw so as to have a predetermined size.

The present invention is not limited to the four-layer layered product 62 in that the lower magnetic polar layer 39, the gap layer 40, the upper magnetic polar layer 41, and the upper core layer 42 are formed from beneath in that order; the layered product 62 may also have a three-layer structure in that the lower magnetic polar layer 39, the gap layer 40, and the upper magnetic polar layer 41 are deposited from beneath in that order, for example.

In the next to the process shown in FIG. 28, after the insulating layer 58 shown in FIG. 2 is formed, the second coil pieces 56 are patterned along on the insulating layer 58 to the connection surfaces 81. At this time, the end regions 56a and 56b of the second coil pieces 56 are formed so as to directly come in contact with the connection surfaces 81 formed on the end regions 55a and 55b of the first coil pieces 55, thereby electrically connecting between both coil pieces 55 and 56 together. The second coil pieces 56 are made of a non-magnetic conductive material such as Cu by plating. A plurality of the second coil pieces 56 are provided.

According to the manufacturing method described above, in the process shown in FIG. 23, the upper surfaces of the coil insulating layer 36, the upheaval layer 32, and the back gap layer 33 are flattened along the reference surface A so as to be flush therewith using the CPM technique. Moreover, on the flattened surfaces, the connection surfaces 81 are exposed. Therefore, the end regions 56a and 56b in the track width direction (the X-direction in the drawings) of the second coil pieces 56 can be connected to the end regions 55a and 55b of the first coil pieces 55 in a direct contact state with the connection surfaces 81 therebetween. Accordingly, the first coil pieces 55 and the second coil pieces 56 can be electrically connected together in a direct contact state without inclusions such as a connection layer, eliminating the electrical resistance due to the inclusions.

In order to improve the connection to the second coil pieces 56 by increasing the area of the connection surfaces 81, in the process shown in FIG. 20, it is at least preferable that widths of the end regions 55a and 55b of the first coil pieces 55 at positions mounting on the raised layers 80 be larger than the width of the center region 55f. Also, it is preferable that widths of the end regions 55a and 55b at positions mounting on the raised layers 80 be larger than the widths of the second coil pieces 56.

Also, the area of the connection surfaces 81 may be smaller than the area of the bottom surfaces 56a1 and 56b1 of the end regions 56a and 56b in the second coil pieces 56 at positions mounting on the connection surfaces 81 and the coil insulating layer 36. However, since if it is too small, the electrical resistance increases, in the process shown in FIG. 23, it is preferable that the area of the connection surfaces 81 be within a range of 50% to 100% of the area of the bottom surfaces 56a1 and 56b1 of the end regions 56a and 56b in the second coil pieces 56 at positions mounting on the connection surfaces 81 and the coil insulating layer 36.

According to the manufacturing method of the thin film magnetic head 1A shown in FIGS. 17 to 28, since the raised layers 80 are formed under the end regions 55a and 55b of the first coil pieces 55 so as to raise the end regions 55a and 55b upward higher than the center region 55f, even when the coil insulating layer 36 is formed on the upper surfaces 55e of the first coil pieces 55, as long as the coil insulating layer 36 is polished by the CMP, the connection surfaces 81 to the second coil pieces 56 can be simply exposed, eliminating to form through-holes on the coil insulating layer 36. If the through-holes are assumed to form on the coil insulating layer 36, etching might be needed. Since it is difficult to form the through-holes by the etching at precise positions and depths with a high degree of accuracy, the positional displacement of the through-holes reduces contact areas between the first coil pieces 55 and the second coil pieces 56, and increases the electrical resistance, thereby producing heat in connection portions between the first coil pieces 55 and the second coil pieces 56. Also, a problem arises in that forming the through-holes damages the end regions 55*a* and 55*b* of the first coil pieces 55.

Whereas, according to the manufacturing method of the thin film magnetic head 1A shown in FIGS. 17 to 28, the connection surface 81 is determined by the position at which the raised layer 80 is formed, enabling the connection surface 81 to be formed at a precise position with a high-degree of accuracy because the raised layer 80 is formed by photo-etching. Also, during polishing the coil insulating layer 36 by the CMP technique, the connection surface 81 can be exposed so as to have a predetermined exposed area by adjusting the scraping amount. Therefore, the excellent connections between the first coil pieces 55 and the second coil pieces 56 are enabled, suppressing the increase in electrical resistance.

Furthermore, since a recess is not necessary to be provided in the lower core layer 29, the sectional area of the lower core layer 29 can be increased. Accordingly, the magnetic saturation of the lower core layer 29 is suppressed, improving the magnetization efficiency.

As according to the embodiment, by providing the band-shaped raised layer 80 only on the required portions of the lower core layer 29, not only the insulation performances between the first coil pieces 55 and the second coil pieces 56 other than the connection surfaces 81, between the second coil pieces 56, and between the layered product 62 but also the insulation performances between the lower core layer 29 and the second coil pieces 56 and between the lower core layer 29 and the layered product 62 on regions outside the end-faces 55*c* and 55*d* of the first coil pieces 55 and between the first coil pieces 55 can be easily assured with a sufficient film thickness by the coil insulating layer 36 covering the upper surfaces 55*e* of the first coil pieces 55.

Since the connection surface 81 is formed as a flattening surface flush with the upper surface 36*a* of the coil insulating layer 36, the end regions 56*a* and 56*b* of the second coil pieces 56 can be easily mounted on the connection surfaces 81 so that the first coil pieces 55 are preferably connected to the second coil pieces 56. Therefore, the contact resistance between the first coil pieces 55 and the second coil pieces 56 can be further suppressed. Since the upper surface 36*a* of the coil insulating layer 36 is a flattening surface, the layered product 62 can be easily formed on the coil insulating layer 36 in a predetermined shape, so that the track width Tw determined by the width of the layered product 62 on the surface opposing the recording medium can be ensured with a high degree of accuracy.

In the process shown in FIG. 19, as according to the embodiment shown in FIG. 4, the raised layer 80 may be formed with a predetermined width in a band shape substantially extending in the height direction; however, the present invention is not limited to this, and in the process shown in FIG. 19 as shown in FIG. 6, the raised layer 80 may be decoupled into a plurality of raised pieces 80*a*, so that the end regions 55*a* and 55*b* of the first coil pieces 55 may also be raised by the raised pieces 80*a*, respectively.

For manufacturing the thin film magnetic head 1B, in the process shown in FIG. 19, the raised layer 80 shown in FIG. 8 is formed; then, in the process shown in FIG. 21, the end-faces 55*c* and 55*d* of the first coil pieces 55 are formed partway the surface of the raised layers 80.

In the process shown in FIG. 21, when the end-faces 55*c* and 55*d* of the first coil pieces 55 are formed partway the surface of the raised layers 80, the above-mentioned leveling effect can be suppressed, so that the end regions 55*a* and 55*b* are formed on the connection surfaces 81 with a large film thickness. As a result, the connection surfaces 81 can be sufficiently raised upward in comparison with the upper surfaces 55*e* of the first coil pieces 55 embedded into the coil insulating layer 36, facilitating the insulating performance between the upper surfaces 55*e* of the first coil pieces 55 and the layered product 62 to be sufficiently ensured.

In the process shown in FIG. 19, as according to the embodiment shown in FIG. 8, the raised layer 80 may be formed with a predetermined width in a band shape substantially extending in the height direction; however, the present invention is not limited to this, and in the process shown in FIG. 19 as shown in FIG. 9, the raised layer 80 may be decoupled into a plurality of raised pieces 80*a*, so that the end regions 55*a* and 55*b* of the first coil pieces 55 may also be raised by the raised pieces 80*a*, respectively.

For manufacturing the thin film magnetic head 1C, in the process shown in FIG. 19, the raised layers 180 and 180*a* shown in FIGS. 11 and 12 are formed; then, in the process shown in FIG. 21, the end-faces 55*c* and 55*d* of the first coil pieces 55 are formed partway the surfaces of the raised layers 180 and 180*a*.

In the process shown FIG. 19, as shown in FIG. 10, the raised layer 180 has the cross-section in a direction parallel to the X-Z plane of a substantially trapezoid shape with a predetermined height h2. The upper surface 180*b* of the raised layer 180 is flattened. The end regions 55*a* and 55*b* of the first coil pieces 55 are formed partway the surface of the raised layers 180, so that the end-faces 55*c* and 55*d* in the track width direction of the first coil pieces 55 are formed so as to mount on the flattened upper surface 180*b*.

Since the upper surface 180*b* of the raised layer 180 is formed in a flattening surface, the end regions 55*a* and 55*b* of the first coil pieces 55 formed on the upper surfaces 180*b* are easily formed to have a large thickness t1. That is, on the upper surfaces 180*b* of the raised layers 180, the first coil pieces 55 are formed by a frame plating. At this time, if the upper surface 180*b* of the raised layer 180 is formed in a flattening surface, the plating on the first coil pieces 55 is easily promoted in the Z-direction in FIG. 20, enabling the film thickness t1 to be increased. If the film thickness t1 is increased, while the area of the connection surfaces 181 may be easily defined, the film thickness of the coil insulating layer 36 formed between the first coil pieces 55 and the layered product 62 can be increased, so that the insulation between the first coil pieces 55 and the layered product 62 may be favorably maintained.

However, it is preferable that the both end-faces 55*c* and 55*d* of the first coil pieces 55 be partway the upper surfaces 180*b* of the raised layers 180. If the end-faces 55*c* and 55*d* might be formed to extend outside the raised layers 180 in the track width direction, the leveling effect would be liable to be produced and the film thickness t1 of the raised layers 180 mounting on the upper surfaces 180*a* of the raised layers 180 would be liable to be reduced. Therefore, in order to suppress the leveling effect, it is preferable that the first coil pieces 55 be formed only partway the upper surfaces 180*b* of the raised layers 180.

The above-mentioned leveling effect may be larger in the case where the first coil pieces 55 are mounted especially on the flattened upper surfaces 180*b* of the raised layers 180 in comparison with the case where the first coil pieces 55 are mounted on the raised layers 80 with a curved surface as shown in FIG. 2. Therefore, in the case where the raised layers 80 with the curved surface are used, even if the first coil pieces 55 are extended outside across the raised layers 80 as shown in FIG. 2, the leveling effect may be smaller in comparison with the case where the flattened raised layers 180 are used and the first coil pieces 55 are extended outside across the raised layers 180.

In the process shown in FIG. 19, as according to the embodiment shown in FIG. 11, the raised layer 180 may be formed with a predetermined width in a band shape substantially extending in the height direction; however, the present invention is not limited to this, and in the process shown in FIG. 19 as shown in FIG. 12, the raised layer 180 may be decoupled into a plurality of raised pieces 180a, so that the end regions 55a and 55b of the first coil pieces 55 may also be raised by the raised pieces 180a, respectively. If the integral raised layers 180 extending in a band shape, as shown in FIG. 11, are formed so as to intersect under the end regions 55a and 55b of a plurality of the first coil pieces 55, respectively, the manufacturing of the raised layers 180 is facilitated.

Also, as shown in FIG. 12, when the raised layers 180 are decoupled into the raised pieces 180a so as to form the end regions 55a and 55b of the first coil pieces 55 on the respective raised pieces 180a, spaces are produced between the adjacent raised pieces 180a, so that the coil insulating layer 36 can be formed with a thick film thickness on these portions, preferably securing the resistance performance between the adjacent end regions 55a and 55b of the first coil pieces 55.

For manufacturing the thin film magnetic head 1D, in the process shown in FIG. 19, the raised pieces 280a shown in FIG. 14 are formed; then, in the process shown in FIG. 21, the end-faces 55c and 55d of the first coil pieces 55 are positioned on the upper surfaces of the raised pieces 280a.

In the process shown in FIG. 19, as shown in FIG. 15, if the diameter d of the raised piece 280a is smaller than the width w1 of the respective end regions 55a and 55b, the area of the end regions 55a and 55b mounting on the raised pieces 280a is reduced, so that the area of the connection surfaces 281 exposed from the upper surface 36a of the coil insulating layer 36 is also reduced. Therefore, for securing the connection between the second coil pieces 56 and the first coil pieces 55 by increasing the areas of the connection surfaces 281, it is preferable that the diameter d of the raised piece 280a be larger than the width w1 of the respective end regions 55a and 55b in the process shown in FIG. 19, as shown in FIG. 16. However, for reducing the leveling effect, as shown in FIG. 15, it may be preferable that the diameter d of the raised piece 280a be smaller than the width w1 of the respective end regions 55a and 55b.

The manufacturing method of the thin film magnetic head 1E shown in FIGS. 29 to 32 is similar to that of the magnetic head shown in FIGS. 17 to 28. That is, in the process shown in FIG. 17, the lower core layer 329 is formed in the same way as that of the lower core layer 29; in the process shown in FIG. 18, the Gd settle layer 338 is formed on the lower core layer 329 in the height direction from a position separated from the surface opposing the recording medium in the height direction (the Y-direction in the drawings) by a predetermined distance. Then, in the process shown in FIG. 22, instead of the upheaval layer 32, the magnetic pole tip layer 362 is formed by plating. At this time, the magnetic pole tip layer 362 is formed so that the rear end of the upper magnetic polar layer 351 is mounted on the Gd settle layer 338. Next, in the process shown in FIG. 28, when the layered product 62 is formed as the lower core layer 329, the thin film magnetic head 1E can be manufactured.

In the same way as that shown in FIGS. 7 and 8, the thin film magnetic head 1E is formed to have the cross-section of the raised layer 80 in a direction parallel to the X-Z plane having a semi-circular or semi-ellipsoidal shape with a predetermined height h1. In the case where the end-faces 355c and 355d in the track direction of the first coil pieces 355 are positioned above the upper surface of the raised layer 80, the upheaval layer 32 is plated as the magnetic pole tip layer 362 and the layered product 62 is formed as the lower core layer 329. In addition to that, in the process shown in FIG. 19, the raised layer 80 shown in FIG. 8 may be formed; and in the process shown in FIG. 21, the end-faces 55c and 55d of the first coil pieces 55 may be formed partway the surface of the raised layer 80.

In the case where the raised layer 80 of the thin film magnetic head 1E, in the same way as that shown in FIG. 9, is formed of a plurality of the raised pieces 80a so that the raised pieces 80a are arranged below the end regions 355a and 355b of the first coil pieces 355, respectively, the upheaval layer 32 is plated as the magnetic pole tip layer 362 and the layered product 62 is formed as the lower core layer 329. In addition to that, in the process shown in FIG. 19, the raised layer 80, as shown in FIG. 9, may be decoupled into a plurality of the raised pieces 80a so that the end regions 55a and 55b of the first coil pieces 55 are upward raised by the raised pieces 80a, respectively.

In the case where the raised layer 80 of the thin film magnetic head 1E is formed as the raised layer 180 shown in FIG. 10 or 11, and in the same way as that shown in FIG. 10 or 11, the end-faces 355c and 355d in the track width direction of the first coil pieces 355 are positioned above the flattened upper surface 180b of the raised layers 180, the upheaval layer 32 is plated as the magnetic pole tip layer 362; and the layered product 62 is formed as the lower core layer 329. In addition to that, in the process shown in FIG. 19, the raised layers 180 shown in FIG. 11 are formed; in the process shown in FIG. 21, the end-faces 355c and 355d of the first coil pieces 355 are formed partway the surface of the raised layer 180 so as to manufacture the thin film magnetic head 1E.

In the case where the raised layer 80 of the thin film magnetic head 1E, in the same way as that shown in FIG. 12, is decoupled into a plurality of the raised pieces 180a, and the end regions 355a and 355b of the first coil pieces 355 are upward raised by the raised pieces 180a, respectively, the upheaval layer 32 is plated as the magnetic pole tip layer 362; and the layered product 62 is formed as the lower core layer 329. In addition to that, in the process shown in FIG. 19, the raised pieces 180a shown in FIG. 12 are formed; in the process shown in FIG. 21, the end-faces 355c and 355d of the first coil pieces 355 are formed partway the surfaces of the raised pieces 180a so as to manufacture the thin film magnetic head 1E.

In order to form the raised layer 80 of the thin film magnetic head 1E into hemispherical raised pieces 280a shown in FIGS. 13 and 14; in the same way as that shown in FIG. 15, the diameter d of the raised piece 280a is increased larger than the width w1 of the end regions 355a and 355b of the first coil pieces 355; in the process shown in FIG. 21, the end-faces 355c and 355d in the track width direction of the first coil pieces 355 are positioned above the surfaces 280b of the raised pieces 280a, the procedure may be as follows. That is, the upheaval layer 32 is plated as the magnetic pole tip layer 362; and the layered product 62 is formed as the lower core layer 329. In addition to that, in the process shown in FIG. 19, the raised pieces 280a shown in FIG. 14 are formed; in the process shown in FIG. 21, the diameter d of the raised piece 280*a*, as shown in FIG. 15, may be reduced smaller than the width w1 of the end regions 55*a* and 55*b*.

Also, in the raised layer 80 of the thin film magnetic head 1E, in the same way as that shown in FIG. 16, in order to increase the diameter d of the raised piece 280*a* larger than the width w1 of the end regions 355*a* and 355*b* of the first coil pieces 355, the upheaval layer 32 is plated as the magnetic pole tip layer 362; and the layered product 62 is formed as the lower core layer 329. In addition to that, in the process shown in FIG. 19, the raised pieces 80*a* are formed; in the process shown in FIG. 21, the end-faces 55*c* and 55*d* of the first coil pieces 55 may be positioned above the upper surfaces of the raised pieces 280*a*. At this time, in the process shown in FIG. 19, as shown in FIG. 16, the diameter d of the raised piece 280*a* is increased larger than the width w1 of the end regions 55*a* and 55*b*.

The thin film magnetic head according to the present invention described above is housed into a magnetic head device mounted on a hard disk device, for example. The thin film magnetic head may be housed into either a floating magnetic head or a contact magnetic head. Also, the thin film magnetic head may be used in magnetic sensors other than the hard disk devices.

What is claimed is:

1. A thin-film magnetic head comprising:
   a lower core layer formed so as to extend in a height direction from a surface opposing a recording medium;
   a magnetic layer connected to the lower core layer directly or indirectly at a position spaced from an opposing surface in the height direction by a predetermined distance; and
   a coil layer toroidally winding around the magnetic layer; and
   a raised layer provided on the lower core layer at a position spaced in a track width direction from a center of the lower core layer in a track width direction,
   wherein the toroidal coil layer is connected to a plurality of first coil pieces formed between the lower core layer and the magnetic layer and a plurality of second coil pieces formed on the magnetic layer,
   wherein upper surfaces of the first coil pieces are covered with an insulating layer other than connection surfaces to the second coil pieces, the connection surfaces of the first coil pieces being raised upward and exposed from an upper surface of the insulating layer so that the second coil pieces are formed in contact with the connection surfaces of the first coil pieces,
   wherein part of the first coil pieces is mounted on the raised layer, part of the upper surfaces of the first coil pieces mounted on the raised layer are exposed from the upper surface of the insulating layer, so that the exposed surface becomes the connection surface, and
   wherein the upper surface of the lower core layer is formed as a flat surface over a region opposing the first coil pieces between a pair of the raised layers and formed below both sides of the first coil pieces.

2. A head according to claim 1, wherein an upper surface of the raised layer is a flattening surface, and at least part of the first coil pieces mounted on the flattening surface becomes the connection surface.

3. A head according to claim 2, wherein ends of the first coil pieces are mounted on the flattening surface.

4. A head according to claim 1, wherein an upper surface of the raised layer is a curved surface, and part of the first coil pieces mounted on the curved surface becomes the connection surface.

5. A head according to claim 4, wherein the first coil pieces are formed partway the curved surface.

6. A head according to claim 1, wherein the upper surface of the insulating layer and the connection surfaces of the first coil pieces are an identical flattening surface.

7. A head according to claim 1, wherein the raised layer intersects with a plurality of lower surfaces of the first coil pieces.

8. A head according to claim 1, wherein the raised layer is arranged under each of the first coil pieces.

9. A head according to claim 1, wherein on the lower core layer, a lower magnetic polar layer, a gap layer, and an upper magnetic polar layer, which is the magnetic layer, are deposited in that order from beneath so as to form a deposited structure, and a track width Tw is determined by a width of the deposited structure on the opposing surface in a track width direction.

10. A head according to claim 1, wherein on the lower core layer, at least a lower magnetic polar layer, a gap layer formed of a non-magnetic metallic material, and an upper magnetic polar layer are plated in that order from beneath so as to form a magnetic-polar tip layer with a track width Tw defined by a width of an end face adjacent to an opposing surface to a recording medium in a track width direction, and on the magnetic-polar tip layer, the magnetic layer is deposited.

11. A head according to claim 10, wherein a saturated magnetic induction density of the magnetic layer is lower than that of the upper magnetic polar layer.

12. A head according to claim 1, wherein a length of the second coil pieces in a first direction perpendicular to a flowing direction of an electric current is larger than that of the first coil pieces in the first direction.

13. A head according to claim 1, wherein a film thickness of the second coil pieces is larger than that of the first coil pieces.

14. A thin-film magnetic head comprising:
   a lower core layer formed so as to extend in a height direction from a surface opposing a recording medium;
   a magnetic layer connected to the lower core layer directly or indirectly at a position spaced from an opposing surface in the height direction by a predetermined distance; and
   a coil layer toroidally winding around the magnetic layer; and
   a raised layer provided on the lower core layer at a position spaced in a track width direction from a center of the lower core layer in a track width direction,
   wherein the toroidal coil layer is connected to a plurality of first coil pieces formed between the lower core layer and the magnetic layer and a plurality of second coil pieces formed on the magnetic layer,
   wherein upper surfaces of the first coil pieces are covered with an insulating layer other than connection surfaces to the second coil pieces, the connection surfaces of the first coil pieces being raised upward and exposed from an upper surface of the insulating layer so that the second coil pieces are formed in contact with the connection surfaces of the first coil pieces, and
   wherein the connection surfaces of the first coil pieces being disposed at or below a lower surface of the magnetic layer.

15. A head according to claim 14, wherein part of the first coil pieces is mounted on the raised layer, part of the upper surfaces of the first coil pieces being exposed from the upper surface of the insulating layer at a position on that the first coil pieces mount, so that the exposed surface becomes the connection surface.

16. A head according to claim 14, wherein the raised layer intersects with a plurality of lower surfaces of the first coil pieces.

17. A head according to claim 14, wherein an upper surface of the raised layer is a curved surface, and part of the first coil pieces mounted on the curved surface becomes the connection surface.

18. A thin-film magnetic head comprising:
- a lower core layer formed so as to extend in a height direction from a surface opposing a recording medium;
- a magnetic layer connected to the lower core layer directly or indirectly at a position spaced from an opposing surface in the height direction by a predetermined distance; and
- a coil layer toroidally winding around the magnetic layer, wherein the toroidal coil layer is connected to a plurality of first coil pieces formed between the lower core layer and the magnetic layer and a plurality of second coil pieces formed on the magnetic layer, wherein upper surfaces of the first coil pieces are covered with an insulating layer other than connection surfaces to the second coil pieces, the connection surfaces of the first coil pieces being raised upward and exposed from an upper surface of the insulating layer so that the second coil pieces are formed in contact with the connection surfaces of the first coil pieces, and wherein an upper surface of a raised layer is a curved surface, and part of the first coil pieces mounted on the curved surface becomes the connection surface.

19. A head according to claim 18, further comprising the raised layer provided on the lower core layer at a position spaced in a track width direction from a center of the lower core layer in a track width direction, wherein part of the first coil pieces is mounted on the raised layer, part of the upper surfaces of the first coil pieces being exposed from the upper surface of the insulating layer at a position on that the first coil pieces mount, so that the exposed surface becomes the connection surface.

20. A head according to claim 18, wherein the upper surface of the insulating layer and the connection surfaces of the first coil pieces are an identical flattening surface.

21. A head according to claim 18, wherein the raised layer intersects with a plurality of lower surfaces of the first coil pieces.

22. A head according to claim 18, wherein the raised layer is arranged under each of the first coil pieces.

* * * * *